(12) United States Patent  (10) Patent No.: US 9,134,936 B2
Monden                    (45) Date of Patent:    Sep. 15, 2015

(54) APPARATUS, SYSTEM, AND METHOD OF GENERATING INFORMATION REGARDING PRINTER, AND RECORDING MEDIUM

(71) Applicant: Nobuya Monden, Tokyo (JP)

(72) Inventor: Nobuya Monden, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/477,265

(22) Filed: Sep. 4, 2014

(65) Prior Publication Data

US 2015/0070725 A1    Mar. 12, 2015

(30) Foreign Application Priority Data

Sep. 6, 2013  (JP) ................... 2013-184874
Aug. 8, 2014  (JP) ................... 2014-162097

(51) Int. Cl.
  *G06F 15/00*  (2006.01)
  *G06F 3/12*   (2006.01)
(52) U.S. Cl.
  CPC ............ *G06F 3/1232* (2013.01); *G06F 3/1211* (2013.01); *G06F 3/1292* (2013.01)

(58) Field of Classification Search
  CPC ................ G06F 3/1218; G06F 3/1223
  USPC ........................................ 358/1.15
  See application file for complete search history.

(56) References Cited

U.S. PATENT DOCUMENTS

2004/0137855 A1*  7/2004  Wiley et al. ............ 455/88
2006/0227363 A1* 10/2006  Ogura ................. 358/1.15

FOREIGN PATENT DOCUMENTS

JP    2002-149548    5/2002

\* cited by examiner

*Primary Examiner* — Saeid Ebrahimi Dehkord
(74) *Attorney, Agent, or Firm* — Oblon, McClelland, Maier & Neustadt, L.L.P.

(57) ABSTRACT

In response to information indicating data to be printed from a portable device, a system generates compatible printer information indicating one or more compatible printers compatible with printing of the data to be printed, sing information related to the data to be printed and device information of each one of the nearby printers. Based on the compatible printer information, a display for the system displays thereon a screen that lists one or more compatible printers that are compatible with printing of the data to be printed.

11 Claims, 22 Drawing Sheets

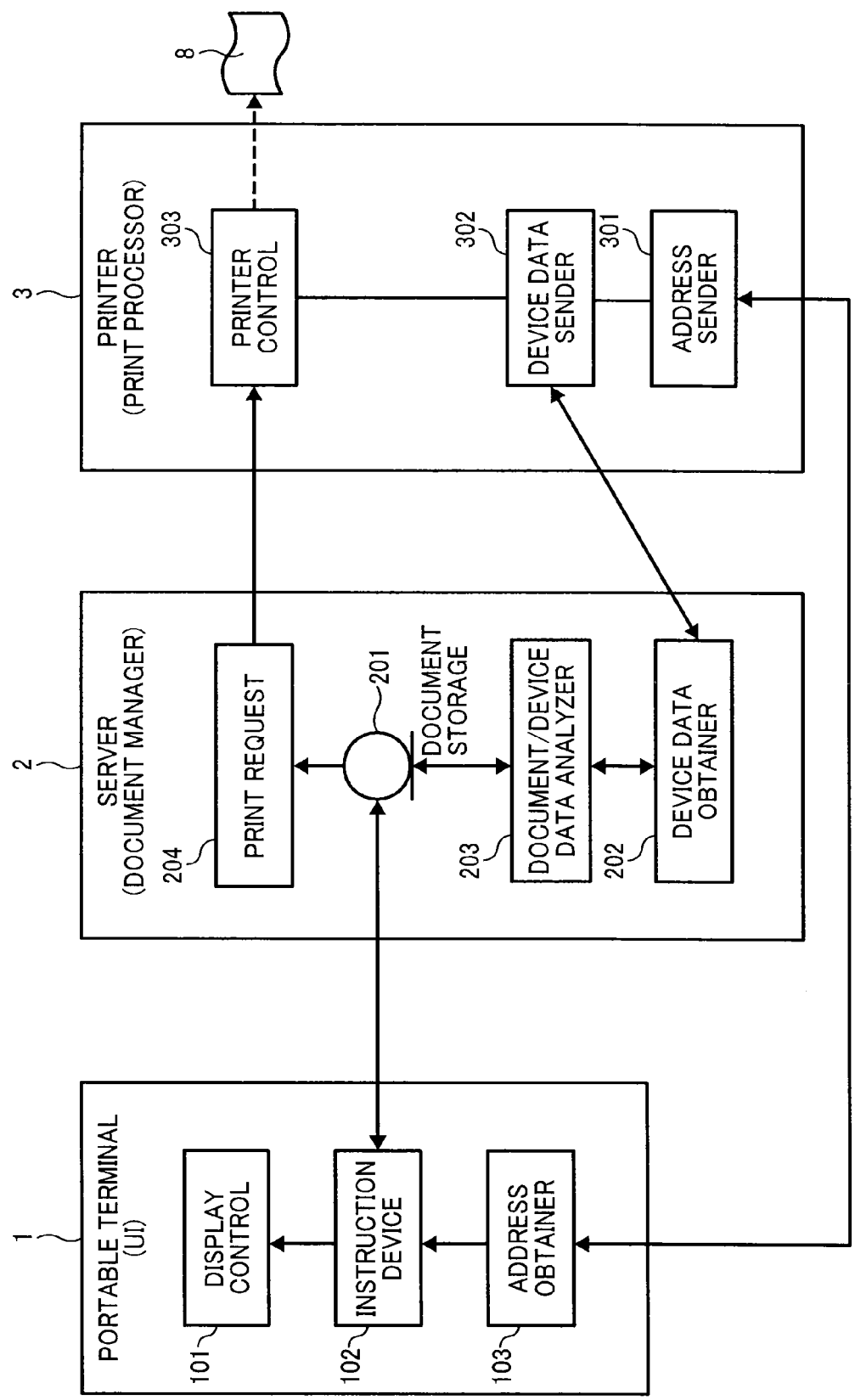

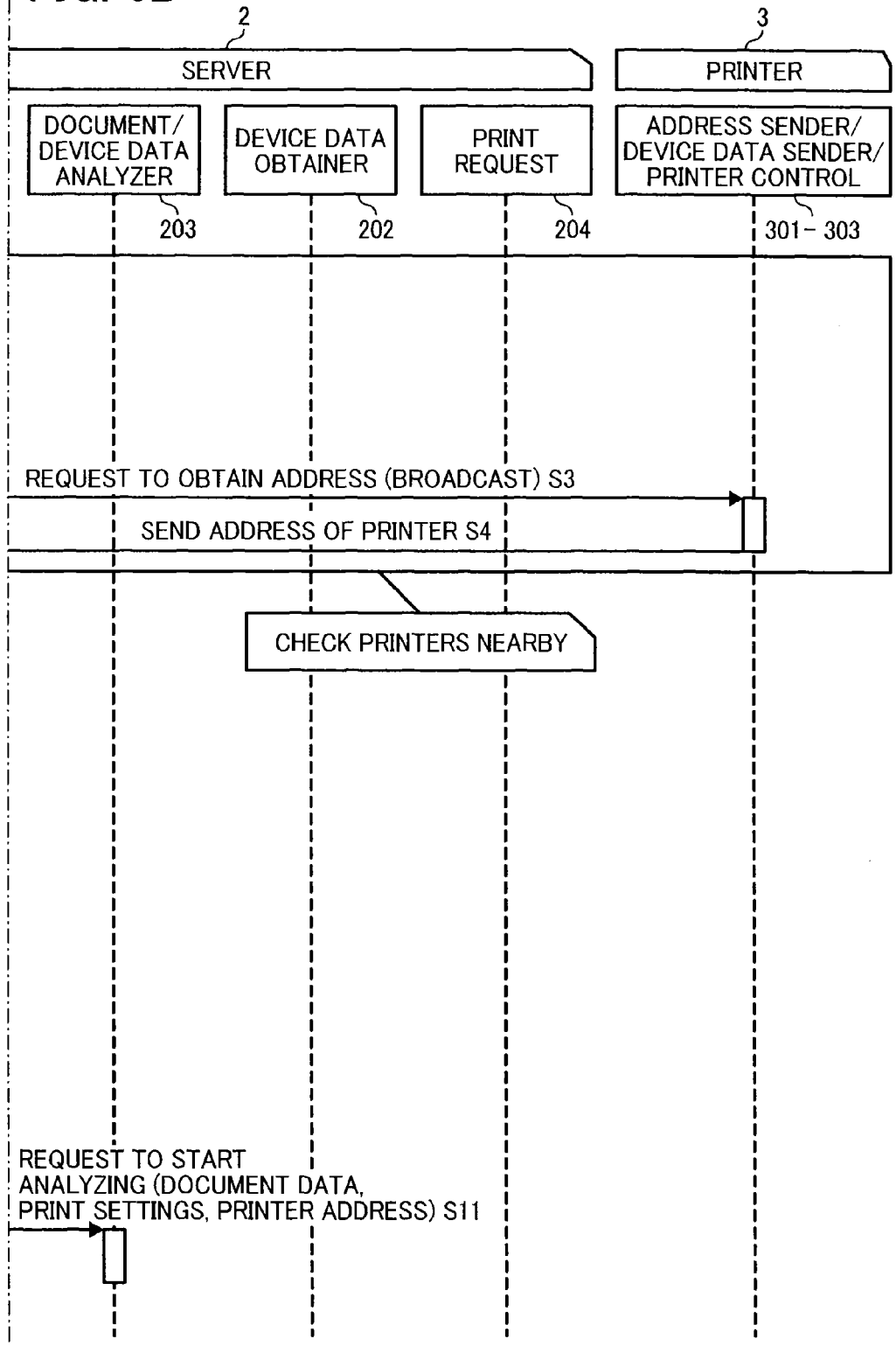

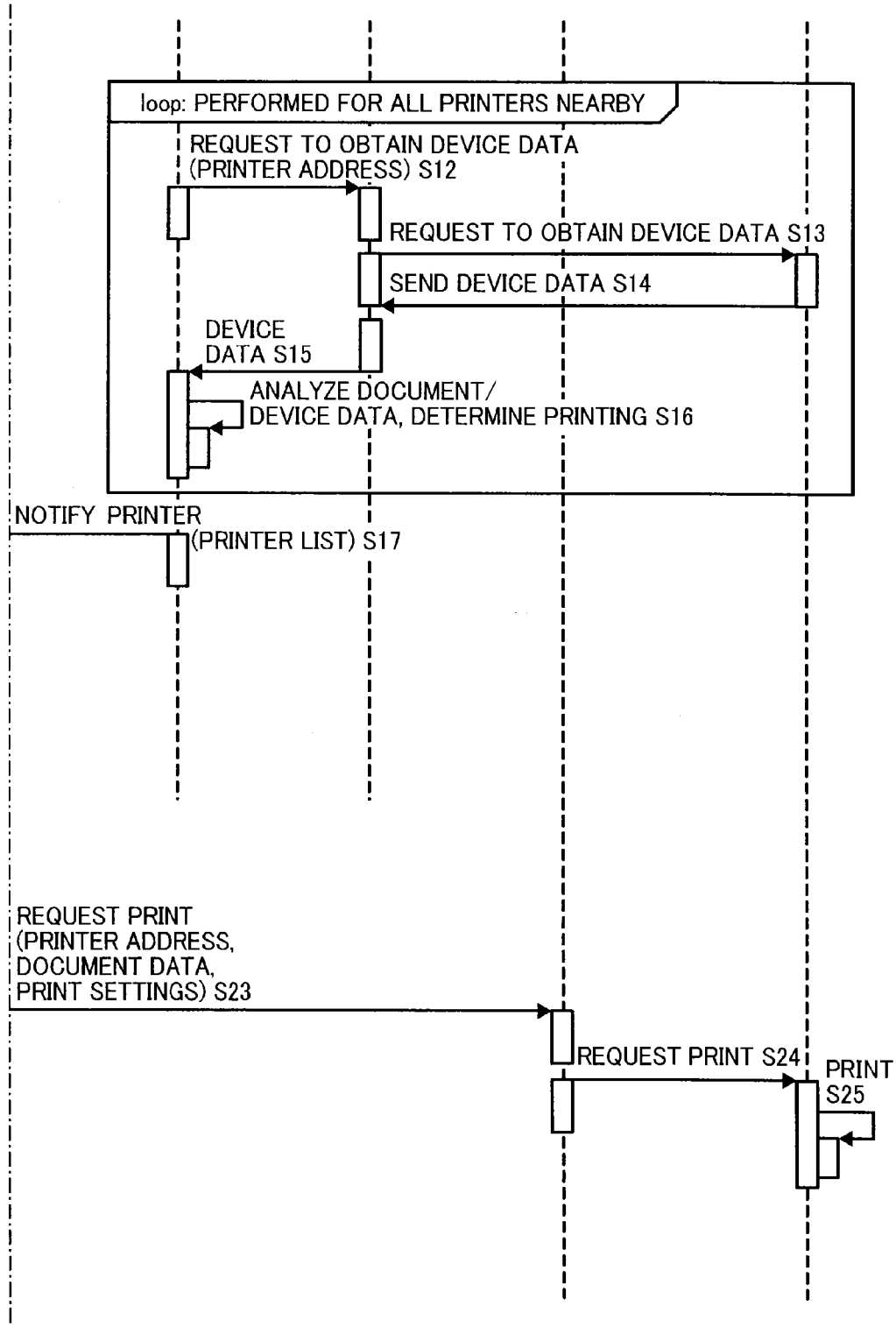

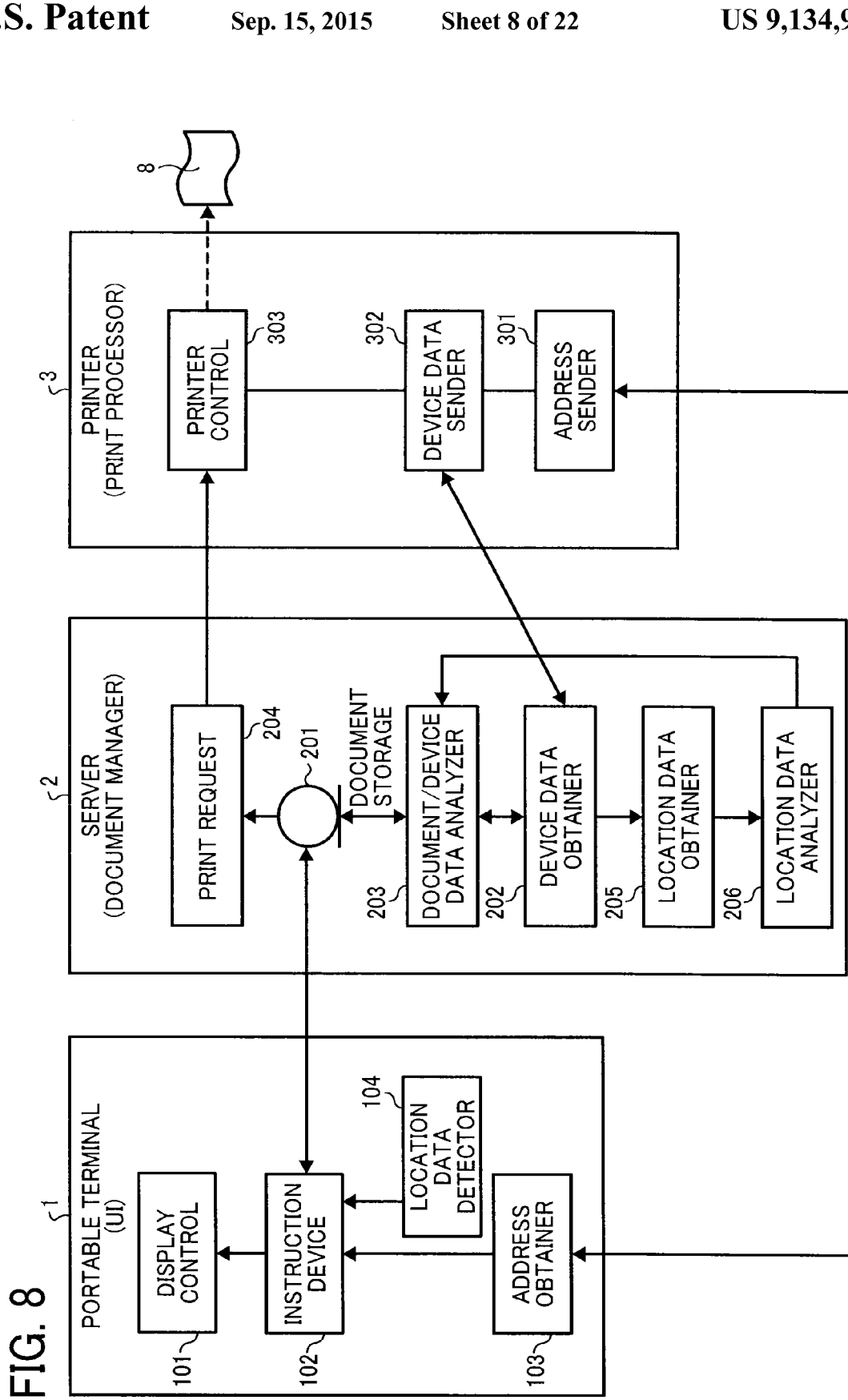

PRINTER LIST 410

| | PRINTER NAME | DISTANCE TO USER (TERMINAL) | DISPLAY MAP |
|---|---|---|---|
| 1 | C | 5m | http://www.sample.co.jp/---- |
| 2 | B | 10m | http://www.sample.co.jp/---- |
| 3 | A | 7m | http://www.sample.co.jp/---- |
| 4 | D | 20m | http://www.sample.co.jp/---- |

411 412 413

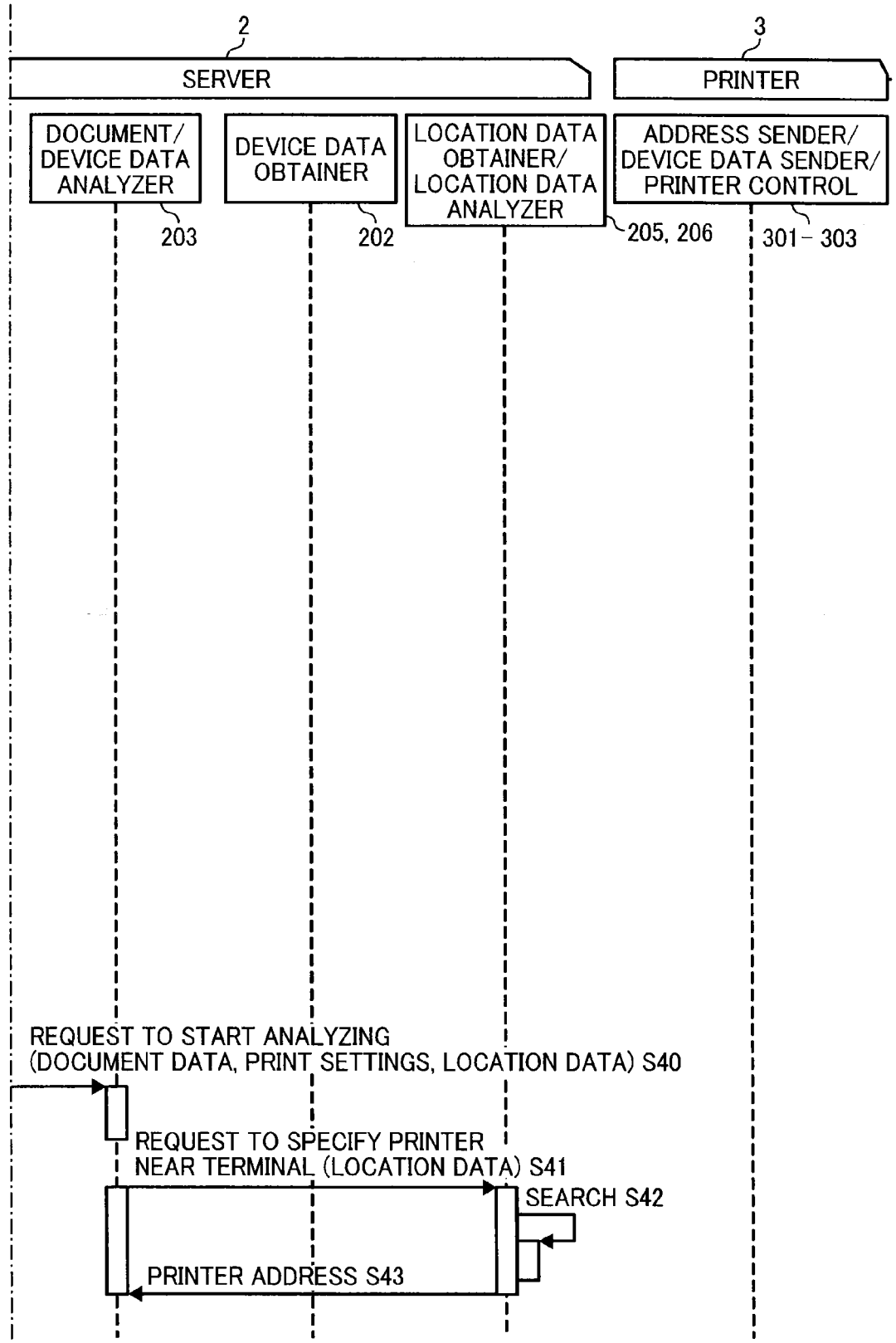

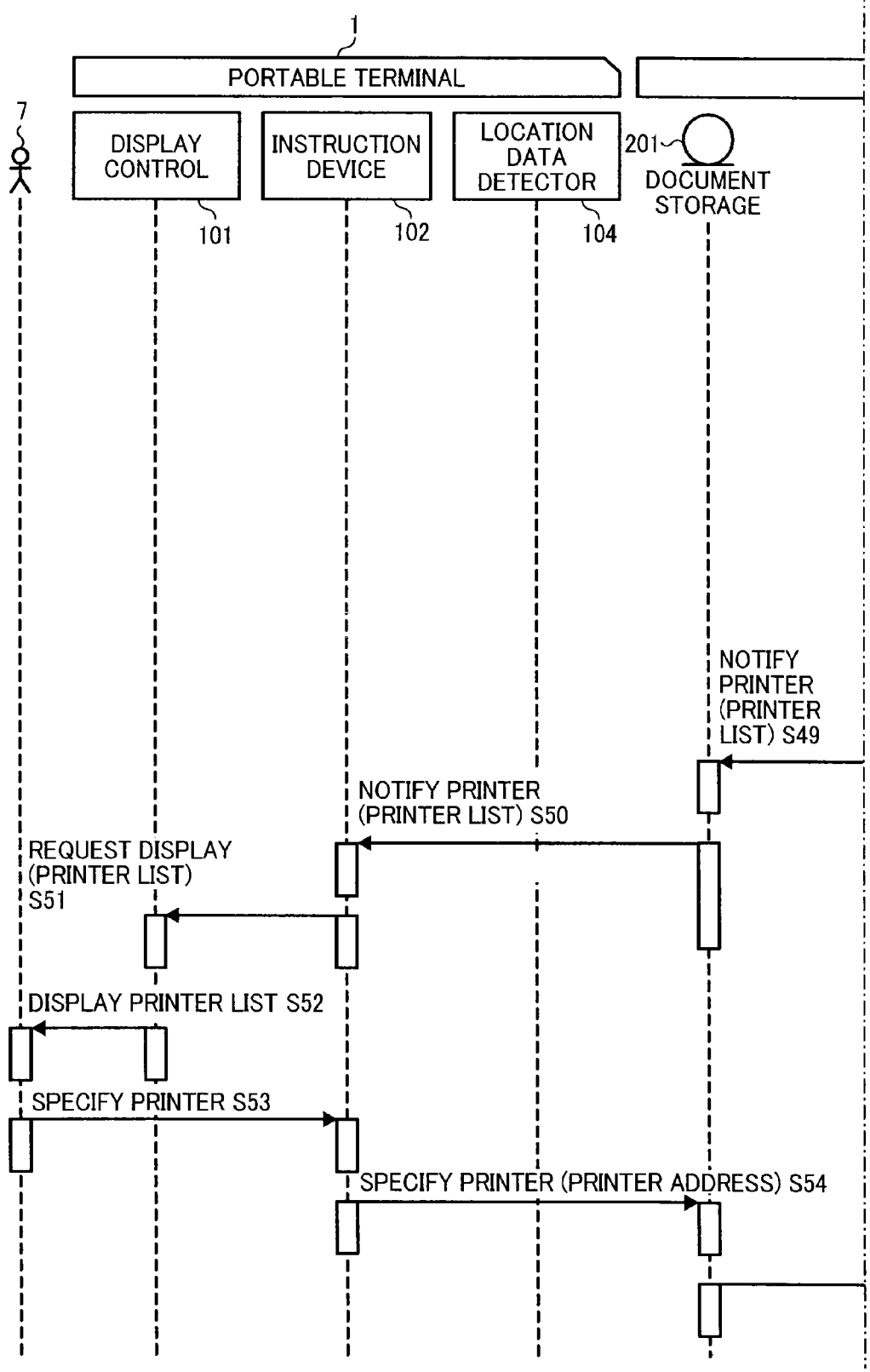

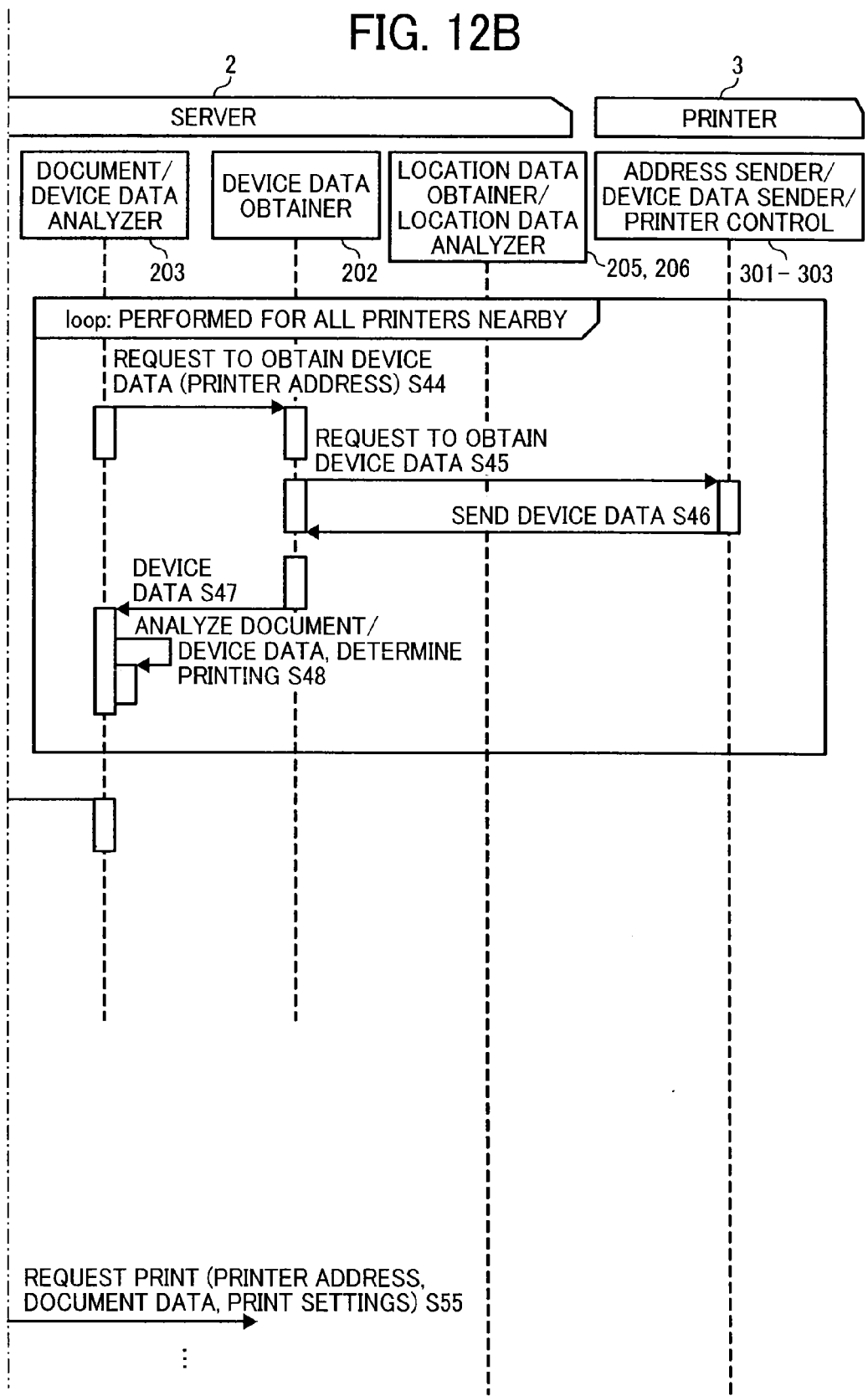

| DISPLAY CONDITION SETTINGS SCREEN | | |
|---|---|---|
| CONDITON | PRIORITY | DISPLAY DEVICE NOT SATISFYING CONDITION? |
| DISTANCE TO USER | 3 | ☐ YES<br>☒ NO ☐ 20m or greater ⟵434<br>☒ 30m or greater |
| DEVICE STATE | 1 | ☒ YES<br>☐ NO ☐ DEVICE IN TROUBLE<br>☐ DEVICE TURNED OFF |
| SPEC | 2 | ☒ YES<br>☐ NO (DEVICE NOT CAPABLE OF PRINTING ACCORDING TO SETTINGS) |

| LIST OF PRINTERS NEARBY | | | | | |
|---|---|---|---|---|---|
| PRIORITY | PRINTER NAME | DISTANCE TO USER (TERMINAL) | DISPLAY MAP | DEVICE STATE | SPEC |
| 1 | C | 5m | http://www.sample.co.jp/— | ON/ UNUSED | OK |
| 2 | B | 10m | http://www.sample.co.jp/— | ON/ USED | OK |
| 3 | A | 7m | http://www.sample.co.jp/— | OFF | OK |
| 4 | D | 20m | http://www.sample.co.jp/— | OFF | NO |

441　442　443　444　445　446

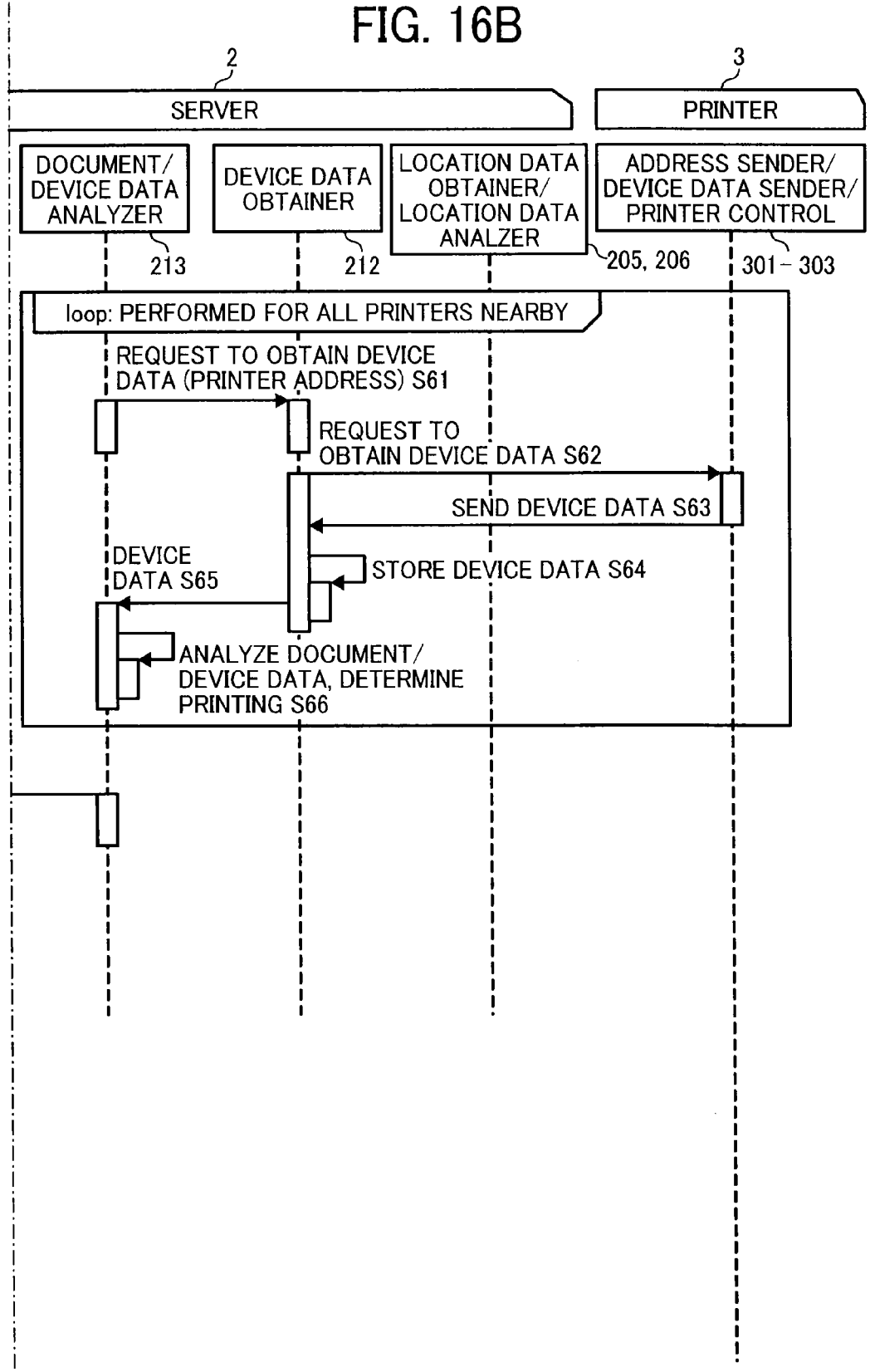

APPARATUS, SYSTEM, AND METHOD OF GENERATING INFORMATION REGARDING PRINTER, AND RECORDING MEDIUM

CROSS-REFERENCE TO RELATED APPLICATIONS

This patent application is based on and claims priority pursuant to 35 U.S.C. §119(a) to Japanese Patent Application Nos. 2013-184874, filed on Sep. 6, 2013, and 2014-162097, filed on Aug. 8, 2014, in the Japan Patent Office, the entire disclosure of which is hereby incorporated by reference herein.

BACKGROUND

1. Technical Field

The present invention generally relates to generating information regarding one or more printers capable of printing data in response to a request received from a portable device.

2. Description of the Related Art

The recent portable terminal such as a portable phone or a tablet, which can be freely carried by a user, may be used to request a server to print any data on a network using a printer on the network that is located near the portable terminal. For example, a document printing system may be provided, which includes a content server connected to a network on which content data is stored, and a printer capable of printing content data. The portable terminal sends a request to the content server to print content data stored on the network using the printer on the network.

SUMMARY

In one aspect of the present invention, in response to information indicating data to be printed from a portable device, a system generates compatible printer information indicating one or more compatible printers compatible with printing of the data to be printed, sing information related to the data to be printed and device information of each one of the nearby printers. Based on the compatible printer information, a display for the system displays thereon a screen that lists one or more compatible printers that are compatible with printing of the data to be printed.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a schematic block diagram illustrating a functional structure of the document printing system, according to an example embodiment of the present invention;

FIGS. 6A, 6B, 7A, and 7B are a data sequence diagram illustrating operation of printing document data selected by a user, performed by the document printing system of FIG. 5, according to an example embodiment of the present invention;

FIG. 8 is a schematic block diagram illustrating a functional structure of the document printing system, according to an example embodiment of the present invention;

FIGS. 11A, 11B, 12A, and 12B are a data sequence diagram illustrating operation of printing document data selected by a user, performed by the document printing system of FIG. 8, according to an example embodiment of the present invention;

FIG. 14 is an illustration of an example display conditions setting screen;

FIG. 15 is an illustration of an example printer list;

FIGS. 16A and 16B are a data sequence diagram illustrating operation of printing document data selected by a user, performed by the document printing system of FIG. 13, according to an example embodiment of the present invention;

Figure 1:
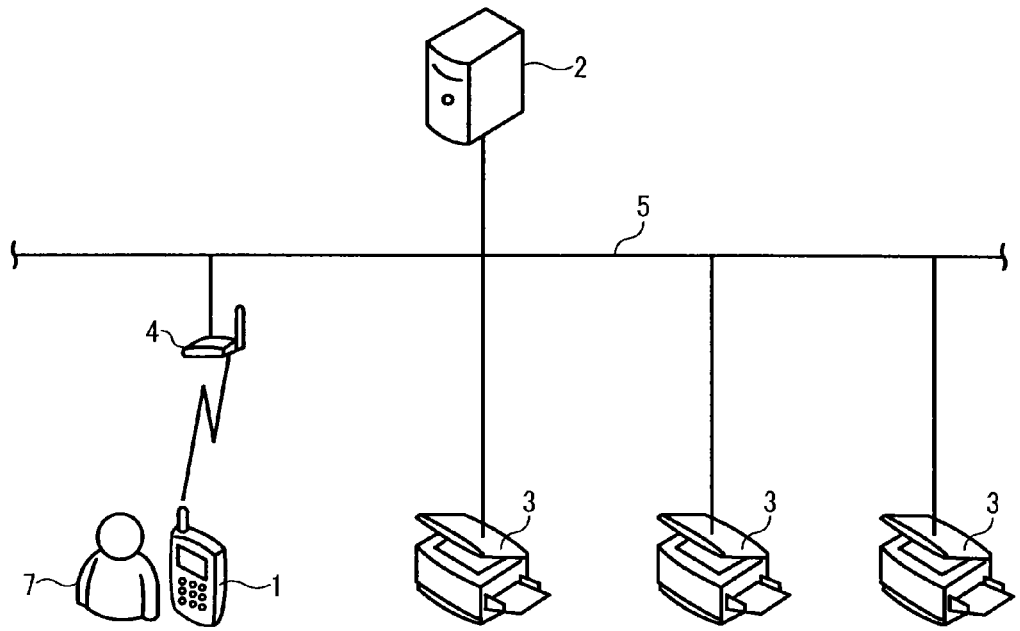
FIG. 1 is a schematic block diagram illustrating a configuration of a document printing system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

[Hardware Structure of Document Printing System]

FIG. 1 is a schematic block diagram illustrating a system configuration of a document printing system, according to an example embodiment of the present invention. The document printing system includes a portable terminal 1 and a server 2, which are communicable via an access point 4 through a network 5. The network 5 further includes a plurality of printers 3. In the document printing system, a user 7 operates the portable terminal 1 to select specific document data stored in the server 2, and instructs one of the printers 3 to print the specific document data.

While the example illustrated in FIG. 1 only displays three printers 3, it is assumed that any number of printers may be provided on the network 5. Further, the user 7 may request to print any data on the network 5, which may be accessible by the server 2. For example, in alternative to obtaining the document data stored in the server 2, assuming that an information processing apparatus such as a personal computer is provided on the network 5, the user 7 may operate the portable terminal 1 to instruct one of the printers 3 to print an image of document data generated by or obtained by the information processing apparatus.

In this example, the portable terminal 1 is any desired device, which is provided with a user interface that interacts with the user 7. Examples of the portable terminal 1 include, but not limited to, a portable phone, multifunctional portable phone such as a smart phone, a portable information terminal such as a personal digital assistant (PDA), a tablet terminal, and any desire mobile terminal that can be carried by the user.

The server 2 is any desired apparatus provided with a large capacity memory capable of storing various content data such as document data, and may be implemented by one or more computers functioning as a server.

The printer 3 receives a print request from the server 2, and forms an image of document data onto a recording sheet. The printer 3 may be any desired printer, copier, facsimile, or multifunctional printer capable of performing a plurality of functions. The printer 3 in this example is provided with a network communication interface.

In this example, each printer 3 on the network 5 does not have to be the same printer such that printers 3 of various types, various functions, or various specifications, may be provided on the network 5.

Further, in this example, the network 5 may be any desired communication network such as wired LAN, wireless LAN, mobile phone network, the Internet, etc., with any desired connection method of wired or wireless.

The access point 4 in this example is an access point for the wireless LAN, which may function as a relay device that connects the wireless LAN with the wired LAN. The access point 4 may be provided in each communication area that is previously determined, which may be referred to as a segment. The portable terminal 1 accesses the access point 4 to be communicable with the server 2 and each printer 3 through the wireless LAN and the wired LAN of the network 5. When provided with a wireless communication port, the portable terminal 1 is able to directly communicate with the printer 3 provided nearby, such as in the same segment, through the wireless LAN. In this disclosure, the printer 3 near the portable terminal 1 corresponds to a printer 3 that is located closely to the portable terminal 1 in terms of its network address, such as the printer 3 located in the same segment to be managed by the same access point. The printer 3 near the portable terminal 1 further corresponds to a printer 3 that is located closely to the portable terminal 1 in terms of its physical location, such as the printer 3 located in the same area.

Figure 2:
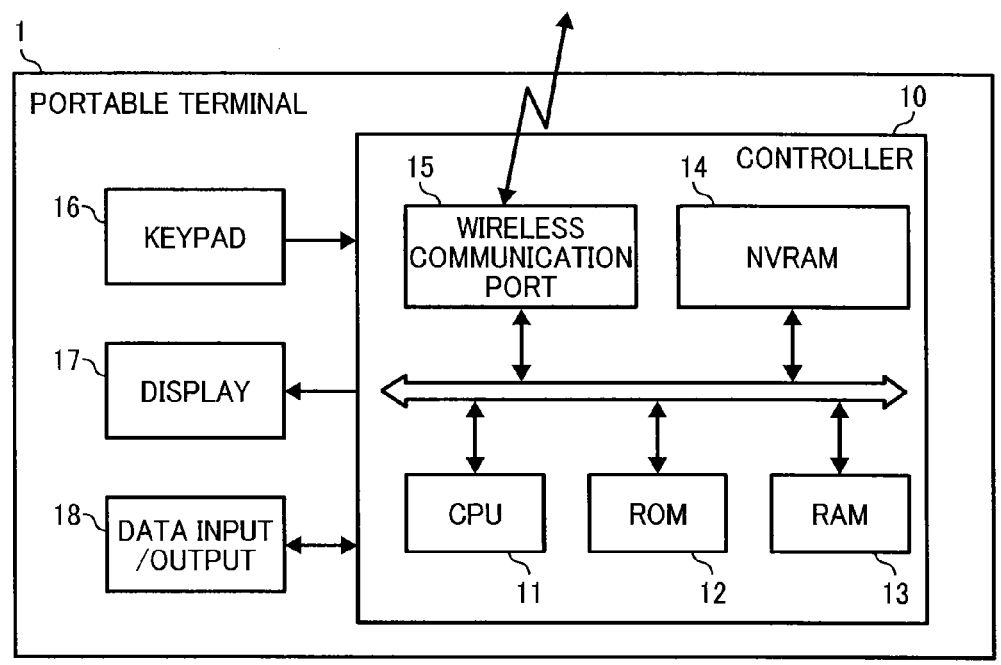
FIG. 2 is a schematic block diagram illustrating a hardware structure of a portable terminal of the document printing system of FIG. 1, according to an example embodiment of the present invention.
Figure 3:
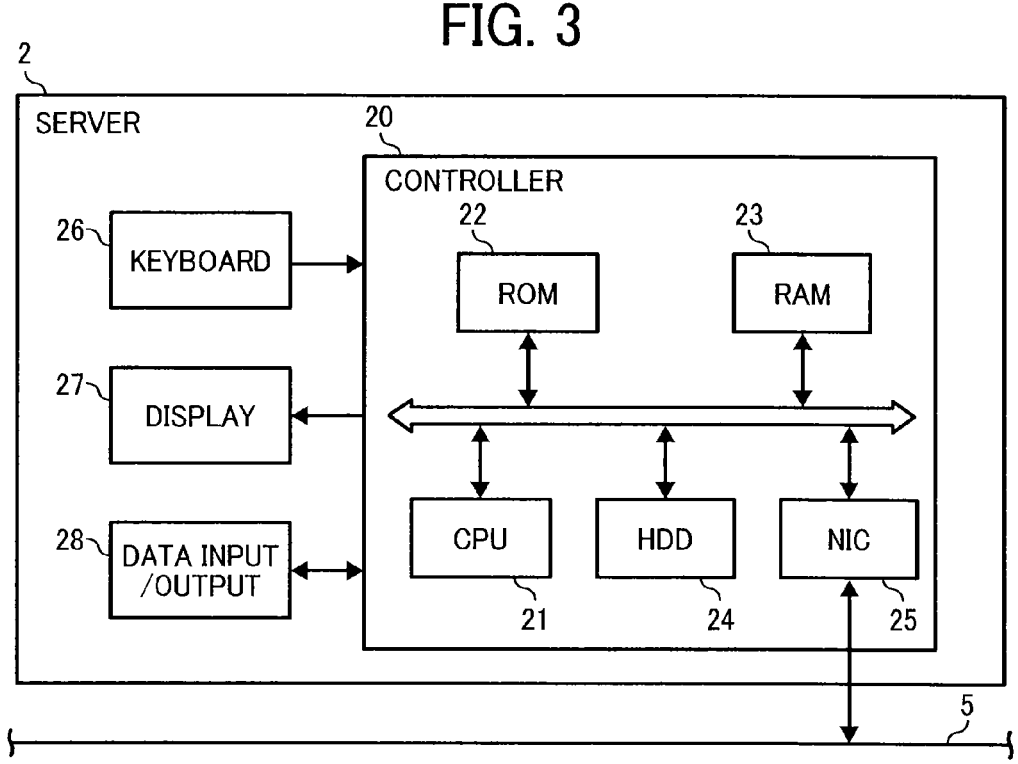
FIG. 3 is a schematic block diagram illustrating a hardware structure of a server of the document printing system of FIG. 1, according to an example embodiment of the present invention.
Figure 4:
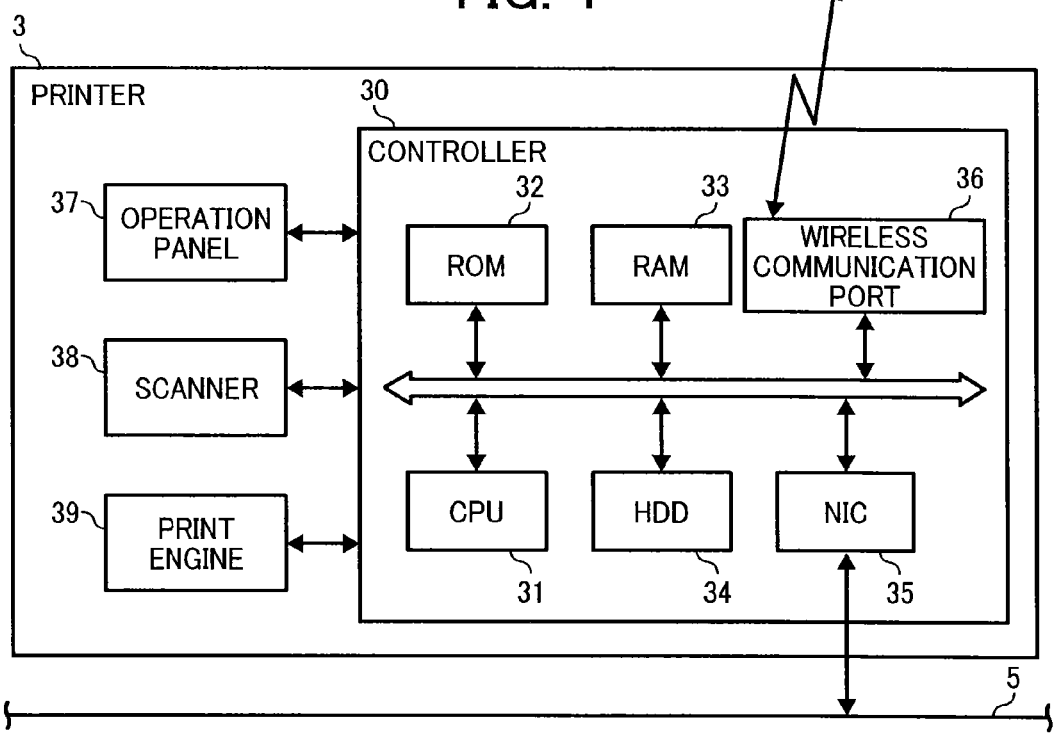
FIG. 4 is a schematic block diagram illustrating a hardware structure of a printer of the document printing system of FIG. 1, according to an example embodiment of the present invention.

Referring now to FIGS. 2 to 4, a hardware structure of the portable terminal 1, server 2, and printer 3 is explained according to an example embodiment of the present invention.

FIG. 2 is a schematic block diagram illustrating an example hardware structure of the portable terminal 1. The portable terminal 1 includes a controller 10, a keypad 16, a display panel 17, and a data input/output 18. The controller 10 includes a central processing unit (CPU) 11, a read only memory (ROM) 12, a random access memory (RAM) 13, a nonvolatile RAM (NVRAM) 14, and a wireless communication port 15.

The CPU 11 is a central processing unit, which centrally controls entire operation of the portable terminal 1, and with the ROM 12, RAM 13, and NVRAM 14, operates as a microcomputer. The ROM 12 is a read only memory, which stores various programs for execution by the CPU 11, and various data for execution of various programs. The RAM 13 functions as a work memory for the CPU 11, and temporarily stores various input/output data and processing data. The NVRAM 14 is a nonvolatile memory, which stores a communication destination address, a phone number, etc.

The wireless communication port 15 is a wireless communication interface, which includes an antenna, for accessing the access point 4 of the wireless LAN of FIG. 1 to communicate with the server 2 through the network 5 or directly communicate with the printer 3 wirelessly.

The keypad 16 is a set of keys, which allows the user to input characters, numerals, or various instructions. The display panel 17 is a liquid crystal display (LCD) panel, which displays thereon various data regarding the operation state of the portable terminal 1 or various data received from the server 2. For most apparatuses such as the multifunctional phone or tablet, the display panel is covered with a transparent touch panel. Through touching a key or an icon displayed on the display panel 17, the user may input or select an instruction. In such case, the touch panel of the display panel 17 functions as a keypad.

The data input/output 18 includes a reader/writer, which may be connected with a removable recording medium such as a memory chip or a memory card, or a connector for connection with an external device. The data input/output 18 may be used to input data from the external device, or output data to the external device.

FIG. 3 is a schematic block diagram illustrating a hardware structure of the server 2, according to an example embodiment of the present invention. The server 2 includes a controller 20, a keyboard 26, a display 27, and a data input/output 18. The controller 20 includes a CPU 21, ROM 22, RAM 23, HDD 24, and NIC 25.

The CPU 21 is a central processing unit (processor), which controls entire operation of the server 2, and with the ROM 22 and the RAM 23, operates as a microcomputer. The ROM 22 is a read only memory, which stores various programs and data for execution by the CPU 21. The RAM 23 functions as a work area for the CPU 21, and temporarily stores various input/output data or processing data. The HDD 24 is a nonvolatile memory of a large capacity size, which may be implemented by a hard disk drive that reads or writes data with respect to a recording memory such as a hard disk. The HDD 24 stores therein document data of various documents, which is one example of content data and which may be selected by the portable terminal 1 to print through the printer 3. The HDD 24 may further store application programs, settings data, and various other data. The NIC 25 is implemented by a network interface circuit, which allows communication with the other device such as the portable terminal 1 or the printer 3 through the network 5.

The keyboard 26 is mounted with a set of keys, which allows the user to input characters, numerals, or various instructions. The display 27 may be implemented by a liquid crystal display (LCD), which displays the operation state of the server 2 or various data thereon. Assuming that the server 2 is an information processing apparatus with the server function, the server 2 does not have to be provided with the keyboard 26 or the display 27, as illustrated in FIG. 1.

The data input/output 28 includes a reader/writer, which may be connected with a removable recording medium such as a floppy disk (FD), CD-ROM, magnetic optical disc (MO), etc., or a connector for connection with an external device. The data input/output 28 may be used to input data from the external device, or output data to the external device.

FIG. 4 is a schematic block diagram illustrating a hardware structure of the printer 3. The printer 3 includes a controller 30, an operation panel 37, a scanner 38, and a print engine 39. The controller 30 includes a CPU 31, ROM 32, RAM 33, HDD 34, NIC 35, and wireless communication port 36.

The CPU 31 is a central processing unit (processor), which controls entire operation of the printer 3, and with the ROM 32 and the RAM 33, operates as a microcomputer. The ROM 32 is a read only memory, which stores various programs and data for execution by the CPU 31. The RAM 33 functions as a work area for the CPU 31, and temporarily stores various input/output data, document data or print settings data that may be received from the server 2, or image processing data.

The HDD 34 is a nonvolatile memory of a large capacity size, capable of storing various data in a substantially similar manner as described above for the HDD 24 of the server 2. More specifically, the HDD 34 may temporarily store document data received from the server 2, in case a size of the document data is relatively large. The HDD 34 may further store application programs, settings data, and various other data. The NIC 35, which may be implemented by a network interface circuit, allows communication with the server 2 through the network 5.

The wireless communication port 36 is a wireless communication interface, which includes an antenna, capable of directly communicating with the portable terminal 1 in case the portable terminal 1 of FIG. 1 is near the printer 3 (that is, within the same wireless LAN segment, for example).

The operation panel 37 is provided with a display panel, operation keys, or a touch panel, which may be directly operated by the user to instruct various functions of the printer 3 such as printing.

The scanner 38 reads an original, which may be set on a document table of the printer 3, into image data. The image data may be temporarily stored in the RAM 33 or HDD 34, or may be stored in the HDD 34 for later use. The scanner 38 may read a document for facsimile transmission, such that the image data generated by the scanner 38 may be transmitted as facsimile data to a destination device through a facsimile communication line.

The print engine 39 prints image data onto a recording sheet to output a printed image. For example, the image data may be generated by the scanner 38, or the image data may be any document data received from the server 2 or the other information processing apparatus at the NIC 35. In another example, the print engine 39 may print the image data converted from facsimile data received through facsimile.

In copy operation, the printer 3 reads an original image into image data using the scanner 38, and prints the read image data onto a recoding sheet using the print engine 39.

The print engine 39 may perform printing, using any desired image forming method such as electrophotographic printing, inkjet printing, thermal printing, etc. In case the printer 3 is implemented by a digital multifunctional printer (MFP), electrophotographic printing is generally used. Further, the printer 3 may print an image in monochrome or color.

FIG. 5 is a schematic block diagram illustrating a functional structure of the document printing system of FIG. 1, according to an example of the present invention. In the document printing system of FIG. 5, the portable terminal 1 instructs the printer 3 to print document data stored in the server 2 as follows.

Based on document data selected by the portable terminal 1, and device information regarding available printers 3 on the network, the server 2 generates a list of printers that are compatible with printing of the selected document data, and causes the display panel 17 of the portable terminal 1 to display the list of compatible printers. With the list of compatible printers, the user can easily select one of the compatible printers 3 that is compatible with printing of the selected document data, to cause the selected printer 3 to print the selected document data.

Referring to FIG. 5, the portable terminal 1, which functions as a user interface, includes a display control 101, an instruction device 102, and an address obtainer 103. These elements are implemented by the controller 10 such as the CPU 11 of FIG. 2, which operates according to the application program, in cooperation with the hardware structure of the portable terminal 1 illustrated in FIG. 2.

The display control 101 causes the display panel 17 to display a screen, in response to receiving information from the server 2. For example, the display control 101 causes the display panel 17 to display the document list for selection by the user, or to display the list of printers for selection by the user.

The instruction device 102 functions as an interface with the server 2. More specifically, the instruction device 102 sends various information, such as a user instruction, to the server 2, via the wireless communication port 15. The instruction device 102 may further receive various information from the server 2, via the wireless communication port 15. In one example, the instruction device 102 sends a user selection of specific document data to be printed in case the document list is displayed by the display control 101. In another example, the instruction device 102 sends a user selection of a specific printer that performs printing of the selected document data, in case the list of printers is displayed by the display control 101. The user selection may be made through the keypad 16, which may be operated by the user.

In this example, when the instruction device 102 sends information regarding the user selection of the document data to be printed to the server 2, the instruction device 102 may additionally send print settings information for the selected document data if the user sets print settings. The instruction device 102 may further send an address of the printer 3, which may be obtained by the address obtainer 103 as described below.

The address obtainer 103 broadcasts a request for obtaining an address, to printers that are located near the portable terminal 1, to obtain the address (identification code, for example) from each printer 3 that responds to that request. For example, the address obtainer 103 obtains the address of each of the printers 3, which are located within the same wireless LAN segment with the portable terminal 1.

The server 2, which functions as a document manager, includes a document storage 201, a device data obtainer 202, a document/device data analyzer 203, and a print request 204. These elements are implemented by the controller 20 such as the CPU 21 of FIG. 3, which operates according to the application program, in cooperation with the hardware structure of the server 2 of FIG. 3.

The document storage 201 stores various document data that can be printed in the HDD 24 (FIG. 3), in association with bibliographic data such as a document name. In addition to text data or graphics data to be printed, the document data may additionally include property data such as a data size (number of pages), page settings data (page size, page orientation), etc. Further, in this example, the document storage 201 functions as an interface that interacts with the portable terminal 1. In one example, the document storage 201 sends a document list, which lists names of documents stored in the document storage 201, to the portable terminal 1.

The device data obtainer 202 requests each one of the printers 3 on the network 5 to send device information of each printer 3, for example, in response to selection of the specific document data from the document list at the portable terminal 1. More specifically, the device data obtainer 202 is notified with the address of each printer 3, which is obtained by the address obtainer 103 of the portable terminal 1. The device data obtainer 202 sends a request for obtaining device information, to each printer 3 that is specified using the obtained address. The device data obtainer 202 obtains device information from a response from the printer 3. The device information includes, for example, information regarding a specification of the printer 3, the operation state of the printer 3 that indicates whether the printer 3 is in use, the printer 3 is turned on its power, or the printer 3 is in trouble.

The document/device data analyzer 203 analyzes the document data obtained from the document storage 201 that is selected at the portable terminal 1, and the device information of each printer that is obtained at the device data obtainer 202. Using the analysis, the document/device data analyzer 203 generates a list of printers that are compatible with the selected document data, and sends the compatible printer list to the portable terminal 1 through the NIC 25.

The printer 3, which functions as a print processor, includes an address sender 301, a device data sender 302, and a printer control 303. These elements are implemented by the controller 3 such as the CPU 31 of FIG. 4, which operates according to the application program, in cooperation with the hardware structure of the printer 4.

The address sender 301 wirelessly transmits its own address (identification code) to the portable terminal 1, in response to a request for obtaining an address from the address obtainer 103 of the portable terminal 1.

The device data sender 302 sends device information to the server 2 through the network 5, in response to the request for obtaining device information from the device data obtainer 202 of the server 2. The device information includes, for example, a specification of the printer 3, and the operation state of the printer 3 that indicates whether the printer 3 is currently in use, or the printer 3 is turned on or off.

The printer control 303 performs printing, for example, in response to a request for printing from the print request 204 of the server 2. More specifically, the printer control 303 operates the print engine 39 of FIG. 4 to print the selected document data according to the specified print settings on a recording sheet to output a printed sheet 8.

Referring to FIGS. 6A, 6B, 7A, and 7B, operation of printing selected document data, performed by the document printing system of FIG. 5, is explained according to an example embodiment of the present invention.

Figure 6A:
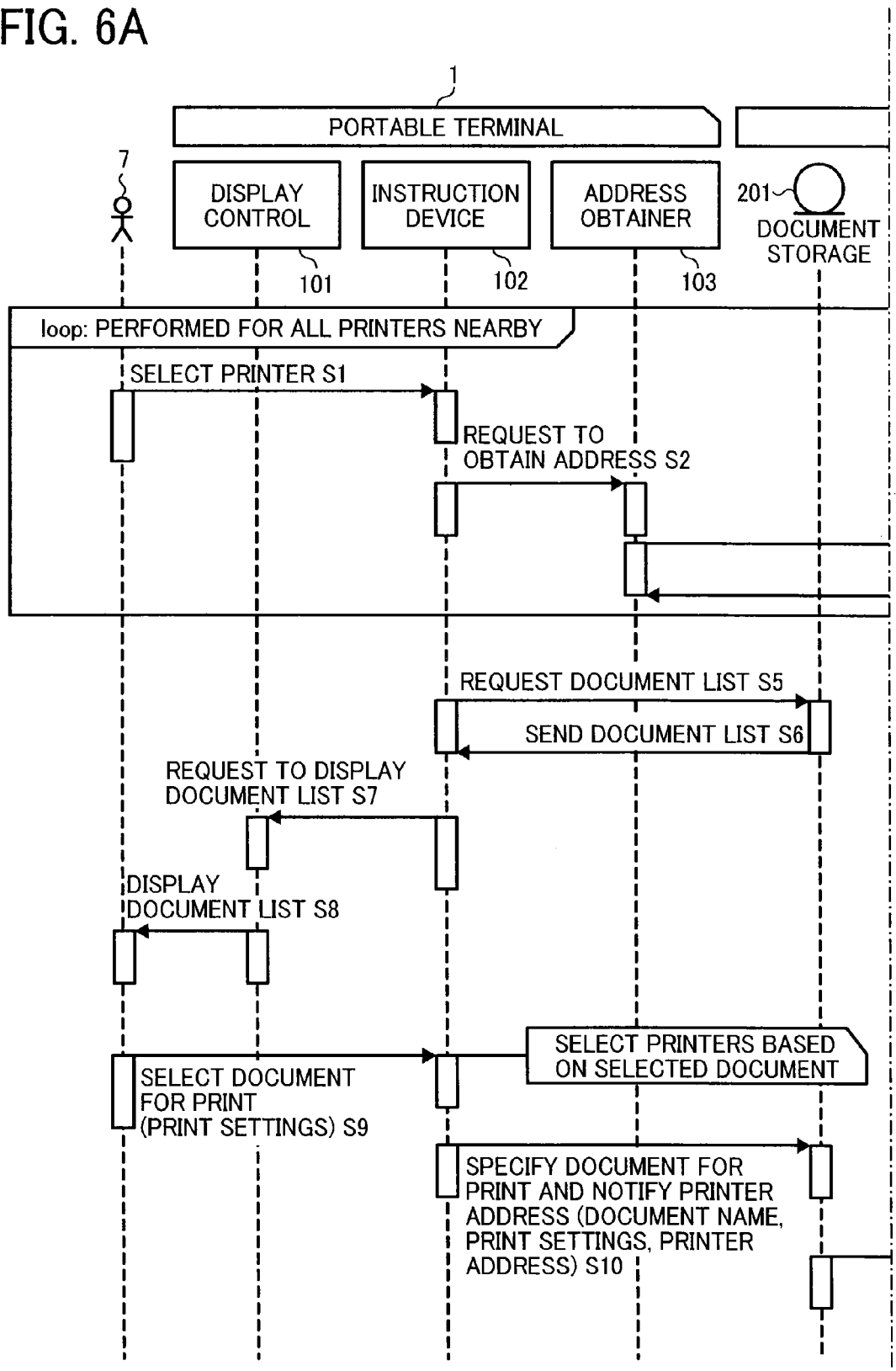

At S1 of FIGS. 6A and 6B, the instruction device 102 receives a user instruction for starting operation of obtaining information regarding one or more printers near the portable terminal 1. For example, the instruction device 102 determines that the user instruction for obtaining information regarding available printers is received, in response to selection of a specific key on the keypad 16.

At S2, the instruction device 102 sends a request to the address obtainer 103, which requests to obtain an address of each of one or more printers near the portable terminal 1.

In response to the address obtaining request from the instruction device 102, at S3, the address obtainer 103 broadcasts a request for address, to the printers near the portable terminal 1. For example, the address obtainer 103 broadcasts the request for address to all printers 3, which have the IP addresses that are located within the same segment managed by the access point 4.

The address sender 301 of the printer 3, which receives the request for address, sends its own address (identification code) to the portable terminal 1. In this example, communication between the portable terminal 1 and the printer 3 is made through a wireless LAN. The address obtainer 103 of the portable terminal 1 receives the address of the printer 3, from each printer 3 located near the portable terminal 1.

The above-described operation of obtaining an address of the printer 3 is performed for all of the printers 3 that are located near the portable terminal 1, that is, the printers 3 located in the same segment managed by the access point 4 to which the portable terminal 1 is currently connected.

At S5, the instruction device 102 of the portable terminal 1 sends a request for document list to the server 2. At S6, the server 2 obtains, from the document storage 201 of the server 2, a list of document data that are stored in the document storage 201 to the portable terminal 1. At S7, the instruction device 102 of the portable terminal 1 instructs the display control 101 to display the document list that is received. At S8, the display control 101 causes the display panel 17 to display the document list for display to the user 7.

The user 7 views the document list being displayed, to select document data to be printed, for example, using the keypad 16 (FIG. 2). At S9, the instruction device 102 receives a user selection that selects the document data to be printed. At this time, the instruction device 102 may receive a user instruction regarding print settings such as information indicating whether to print in monochrome/color, single-sided/double-sided, etc. In case the print settings information is not set by the user, the instruction device 102 uses the default print settings. In this example, for the descriptive purposes, it is assumed that monochrome printing and single-sided printing is set by default.

At S10, the instruction device 102 of the portable terminal 1 sends a request for compatible printer list to the server 2, which includes information regarding the selected document data and the printer addresses of the printers near the portable terminal 1. The request for compatible printer list includes, for example, a document name of the selected document data, print settings in case the print settings information is set at the portable terminal 1, and the printer addresses of the printers nearby. In this example, the request for compatible printer list requests the server 2 to analyze the selected document data (and the print settings information, if available), to determine whether any one of the printers nearby is compatible with printing the selected document data.

At S11, the server 2, which receives the request for compatible printer list, that is, the request for analyzing, obtains the selected document data specified by the document name in the request, or information regarding the selected document data. The server 2 sends the request for compatible printer list, that is, the request for analyzing, to the document/device data analyzer 203, which includes the selected document data, the print settings, and the printer addresses.

Figure 7A:
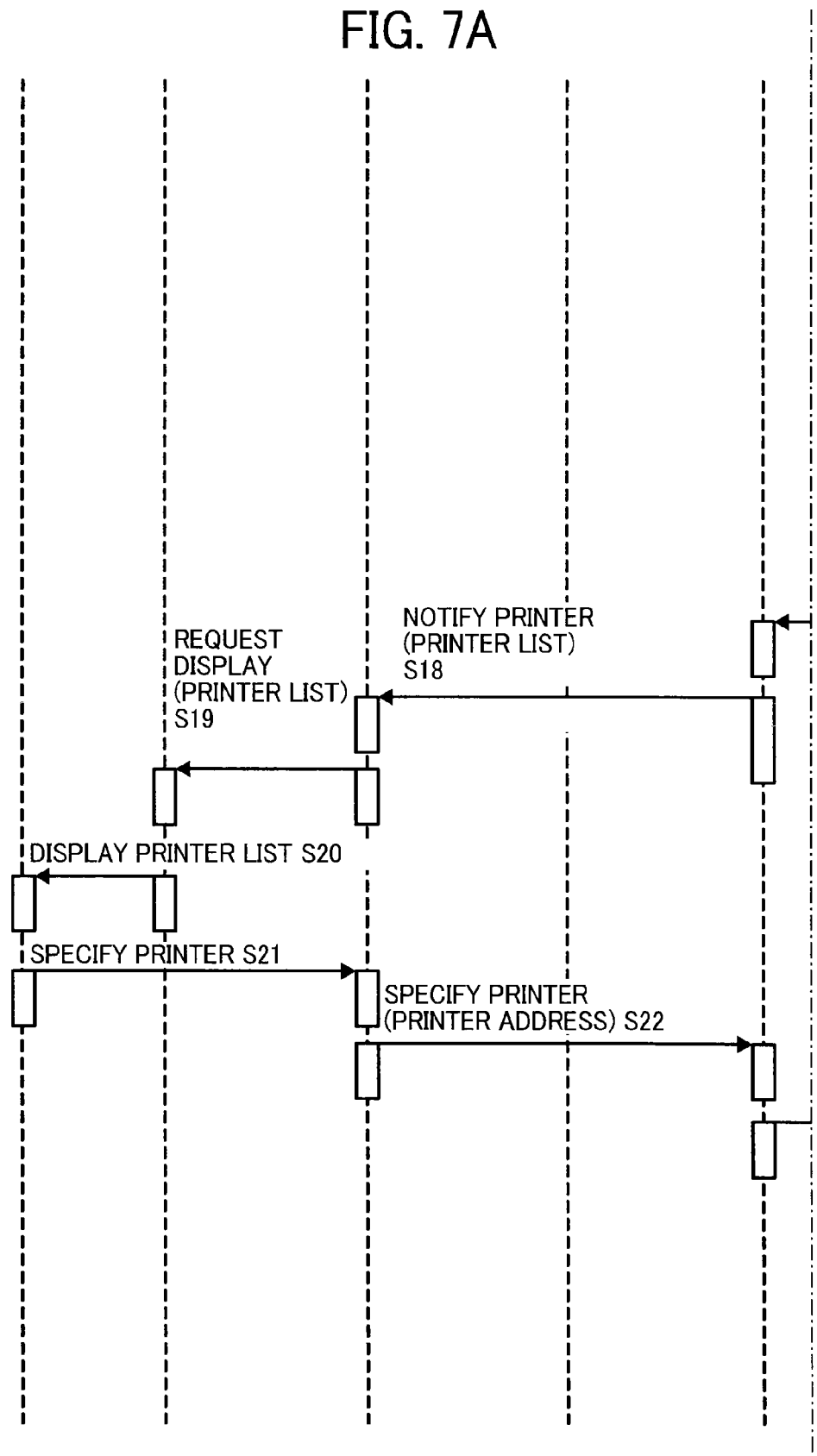

At S12 of FIGS. 7A and 7B, the document/device data analyzer 203 sends a request for obtaining device information, which includes each printer address, to the device information obtainer 202, for each printer.

At S13, the device data obtainer 202 sends the request for obtaining device information to each printer having the address that is received.

At S14, the device data sender 302 of the printer 3, in response to the request for obtaining device information, sends device information such as the device specification and the operation state of the printer 3, to the server 2.

At S15, the device data obtainer 202 of the server 2 receives the device information from each printer 3, and sends the device information for each printer 3 to the document/device data analyzer 203.

The operation state of the printer 3, which may be included as the device information, indicates, for example, whether the printer 3 is currently in use or not, the printer 3 is turned on or off, the printer 3 is in trouble or not. The device specification of the printer 3, which may be included as the device information, may be classified into hardware specification and software specification as follows.

Examples of hardware specification include: whether automatic document feeder (ADF) is provided or not provided, scanning capability indicating a scanning speed in inches per minute (ipm) (for example, 70 ipm), printing capability indicating a printing speed in ipm (for example, single-sided: 30 ipm, double-sided: 20 ipm), whether double-sided printing is available or not available, color printing is available or not available, stapler is provided or not provided, punch is provided or not provided, the printable maximum size (such as A3 size), and device type (such as monochrome laser).

Examples of software specification include: whether OCR is provided or not, scaling function is available or not, web services on devices (WSD) scanner is provided or not.

The above-described operation of obtaining device information is repeated for all of the printers 3 that the server 2 receives the printer addresses from the portable terminal 1.

After completion of obtaining device information, at S16, the document/device data analyzer 203 analyzes the document data received from the document storage 201 and print settings information, with the device information received from the device data obtainer 202. Based on the analysis, the document/device data analyzer 203 determines whether each printer is capable of processing printing of the selected document data according to the print settings, and generates a list of printers that are compatible with printing the selected document data according to the print settings ("compatible printer list"). At S17, the document/device data analyzer 203 sends the compatible printer list to the document storage 201.

For example, assuming that the portable terminal 1 requests to print the selected document data having 100 pages to print in A2 size paper, with monochrome printing and double-sided printing, the document/device data analyzer 203 analyzes as follows to determine one or more compatible printers to print the selected document data according to the print settings information.

The document/device data analyzer 203 analyzes a data size, such as a number of pages, of the document data to be printed. If the number of pages is equal to or greater than 100, the document/device data analyzer 203 determines that the printer 3 having a higher printing capability, is a compatible printer. In this case, since the number of pages to be printed is 100 pages, the document/device data analyzer 203 selects the printer 3 having the higher printing capability, such as having higher printing speeds.

The document/device data analyzer 203 analyzes page settings information of the document data, to obtain a paper size. Since the paper size is A2 in this example, the document/device data analyzer 203 determines that the printer 3 having the printable maximum size is A2 or greater, is a compatible printer.

The document/device data analyzer 203 analyzes the document data or print settings information, to determine whether monochrome/color printing is set. Since the document data is to be printed in monochrome, in this example, the document/device data analyzer 203 determines that the printer 3 having the device type "monochrome printer" is a compatible printer.

The document/device data analyzer 203 analyzes the print settings information, to determine whether single-sided/double-sided printing is set. Since the double-sided printing is set for the document data to be printed, the document/device data analyzer 203 determines that the printer 3 provided with the double-sided printing function is a compatible printer.

Based on the analysis, the document/device data analyzer 203 selects one or more printers 3 having the higher print capability, the maximum printable size of A2 or larger, the monochrome printing function, and the double-sided printing function, as a compatible printer compatible with printing of the selected document data. In case there is no printer having all of the functions, the document/device data analyzer 203 may cause the compatible printer list to include one or more printers that satisfies a largest number of print settings of the selected document data. Alternatively, the document/device data analyzer 203 may send an error message to the document storage 201.

Further, if the operation state of the device information indicates that the printer 3 is in use, in trouble, is turned off, the document/device data analyzer 203 determines that such printer 3 is not capable of printing, and excludes such printer 3 from the compatible printer list.

At S18, the document storage 201 of the server 2 sends the compatible printer list, which is received from the document/device data analyzer 203, to the portable terminal 1.

At S19, the instruction device 102 of the portable terminal 1, which receives the compatible printer list, sends a display request to the display control 101 to display the compatible printer list on the display panel 17. At S20, the display control 101 causes the display panel 17 to display the compatible printer list for display to the user. For example, the display panel 17 may display a list of printer names, which can be recognized by the user, of the compatible printers. The printer name of each printer located near the portable terminal 1 may be obtained by the portable terminal 1 with the address of the printer 3. Alternatively, the server 2 may obtain the name of the printer 3 as a part of device information from the printer 3.

The user 7 views printers listed in the compatible printer list, and selects one of the printers to be used for printing the selected document data. At S21, the instruction device 102 receives a user selection of the printer to print the selected document. At S22, the instruction device 102 sends an address of the specified printer, to the server 2.

At S23, the document storage 201 receives the address of the specified printer, and sends the printer address with the selected document data and the print settings information, which are previously received, to the print request 204 as a print request.

At S24, the print request 204, which receives the print request, sends a print request including the selected document data and the print settings information, to the specified printer 3 having the specified address.

At S25, the printer 3, which receives the print request from the server 2, causes the printer 303 to form an image of the selected document data onto a recording sheet according to the print settings information, and outputs the printed sheet.

The above-described operation of printing data using a printer mainly includes: (1) negotiating between a portable terminal and nearby printers corresponding to S1 to S4, including obtaining addresses of nearby printers; (2) automatically narrowing down the nearby printers according to the selected document data corresponding to S5 to S20 to determine compatible printers, and (3) printing the document data using a selected compatible printer corresponding to S21 to S25.

Through automatically narrowing down the nearby printers according to information regarding the document to be printed, the document printing system of FIG. 1 can make easier for the user to select the most desirable printer to print the selected document data.

More specifically, the server 2 analyzes the document data to be printed, and the device information such as the device specification of available printers near the user, to select one or more of the available printers that are compatible with printing of the selected document. For example, in the above-described example, the document/device data analyzer 203 of the server 2 analyzes a data size or page settings of the selected document data, and the device specification or the operation state of the printer 3. Based on analysis, the document/device data analyzer 203 generates a compatible printer list. The server 2 further sends a list of compatible printers to the portable terminal 1 for selection by the user. With the compatible printer list, the user can easily select the printer that is compatible with printing the selected document data.

Further, the instruction device 102 of the portable terminal 1 may send the print settings information of the document data to be printed, to the server 2. In such case, the server 2 may analyze the print settings information in addition to the document data to be printed, and the device information of the printer 3 to generate a list of compatible printers.

With the compatible printer list, the user is prevented from selecting the printer that is not capable of printing the selected document data, thus suppressing the occurrence of a printing error.

Referring now to FIGS. 8 to 12, a document printing system is explained according to an example embodiment of the present invention. In this embodiment, the compatible printer is selected based on the location data indicating its physical location, in addition to information regarding the document data to be printed.

In this embodiment, the portable terminal 1, the server 2, and the printer 3 have hardware structures of FIGS. 2 to 4 described above, but are different in functional structure than the document printing system of FIG. 5. More specifically, the printer 3 of FIG. 8 is substantially the same in functional structure with the printer 3 of FIG. 5. The portable terminal 1 of FIG. 8 is additionally provided with a location data detector 104. The server 2 of FIG. 8 is additionally provided with a location data obtainer 205 and a location data analyzer 206.

The location data obtainer 205 obtains location data indicating a location of the portable terminal 1 operated by the user, and location data indicating a location of each of the available printers 3 near the portable terminal 1. In this example, the location indicated by the location data refers to a physical location of the portable terminal 1 or the printer 3, while the address of the portable terminal 1 or the printer 3 indicates a network location.

The location data analyzer 206 analyzes the location data obtained by the location data obtainer 205, such as a distance between the portable terminal 1 and each printer 3, to determine an order of the printers 3 in terms of its distance to the portable terminal 1. The location data analyzer 206 sends such information regarding the order of the printers 3 in its distance to the portable terminal 1, to the document/device data analyzer 203. Using such information obtained from the location data analyzer 206, the document/device data analyzer 203 may determine an order of the compatible printers 3 to be listed in the compatible printer list, when a plurality of compatible printers is listed. The compatible printer list, which lists the printers 30 in the determined order, may be transmitted to the portable terminal 1 for display onto the display panel 17. Accordingly, the user 7 can easily select the printer 3, which is located closely to the user, as the printer to print the document data.

The location data obtainer 205 may obtain location data, for example, as follows. The portable terminal 1 is provided with the location data detector 104 having the GPS function, which periodically detects the location data of the portable terminal 1. For example, the portable terminal 1 sends the location data of the portable terminal 1 to the server 2, together with the printer addresses obtained from the printers 3. The document storage 201 of the server 2 sends the location data to the location data obtainer 205 via the document/device data analyzer 203 and the device data obtainer 205.

The printer 3, with a GPU function, stores the location data indicating a location where the printer 3 is provided. In case the location of the printer 3 changes, the location data is updated.

In response to a request for obtaining device information from the device data obtainer 202 of the server 2, the device data sender 302 sends the location data of the printer 3, together with the device information, to the server 2. The device data obtainer 202 of the server 2, which receives the location data, sends the location data of the printer 3 to the location data obtainer 205. By repeating this operation for all available printers, the location data obtainer 205 can obtain the location data of all printers that are detected by the portable terminal 1 as the nearby printers.

In another example, the location data obtainer 205 of the server 2 may be previously stored with the location data in association with the address of the printer, for example, when the server 2 manages information regarding the printers 3 on the network 5. In such case, as long as the location data obtainer 205 obtains the location data of the portable terminal 1, the location data analyzer 206 is able to obtain the location data of each one of the printers 3 having the notified addresses, and analyze the location data of the printer 3 with respect to the location data of the portable terminal 1 for each of the nearby printers.

Further, if the location data of the printer 3 is managed by the server 2, operation of obtaining addresses of printers 3 near the portable terminal 1 may be omitted. More specifically, in response to detection of the portable terminal 1 on the network 5, the location data analyzer 206 may extract one or more printers 3, which are located within a predetermined distance to the portable terminal 1, notifies the address of each of the extracted printers 3 to the device data obtainer 202, and causes the device data obtainer 202 to obtain device data information of the extracted printers 3 with the notified addresses. In this manner, the operation of negotiating between the portable terminal 1 and the nearby printers 3, which is performed at S1 to S4 of FIG. 6, can be omitted. The server 2, which receives the location data of the portable terminal 1, can automatically determine the nearby printers 3 that are physically located near the portable terminal 1, using the location data of the printers 3 that are stored. In one example, the portable terminal 1 may send the location data of the portable terminal 1, when accessing the server 2 through the access point 4. In this manner, processing to be performed by the portable terminal 1 can be simplified.

Further, in this example where the server 2 automatically specifies the nearby printers 3, the location data analyzer 206 may send information indicating the order of nearby printers 3 in terms of its distance to the portable terminal 1, to the document/device data analyzer 203. For example, when there is more than one printer located near the portable terminal 1, the document/device data analyzer 203 generates a list of printers in the order according to a distance to the portable terminal 1. The portable terminal 1 then displays the list of printers, while listing the printer 3 nearest to the portable terminal 1 first onto the display panel 17.

Further, when sending the request for displaying the compatible printer list, the server 2 may include information regarding the location data, such as the distance to the portable terminal 1, and/or information regarding a map indicating the location of the printer 3, as a part of the request for displaying. When providing map information, it is assumed that the server 2 stores, in the HDD 24 or any memory accessible by the server 2, map data of an area where the printers 3 connected to the network 5 reside.

The display control 101 of the portable terminal 1 causes the display panel 17 to display a map indicating the location of each compatible printer with the location of the portable terminal 1, in addition to or in alternative to the compatible printer list, or selectively according to a user instruction.

Figures 9, 10:
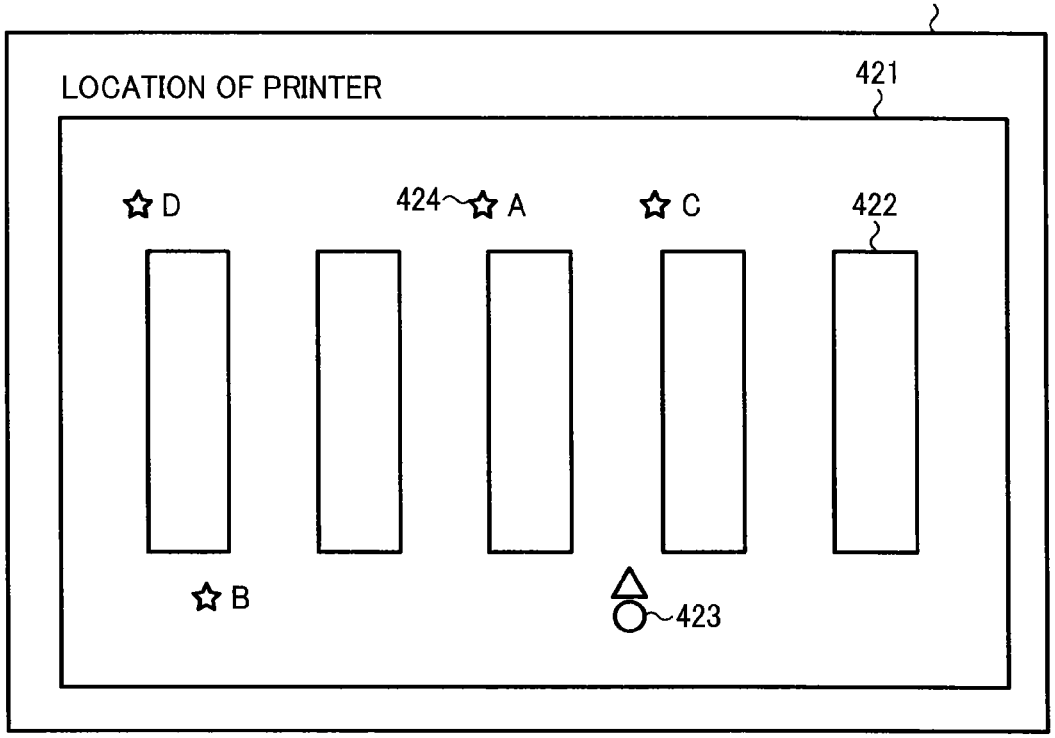
FIG. 9 is an illustration of an example print list screen, displayed at the portable terminal.
FIG. 10 is an illustration of an example map screen, displayed at the portable terminal.
Figure 11A:
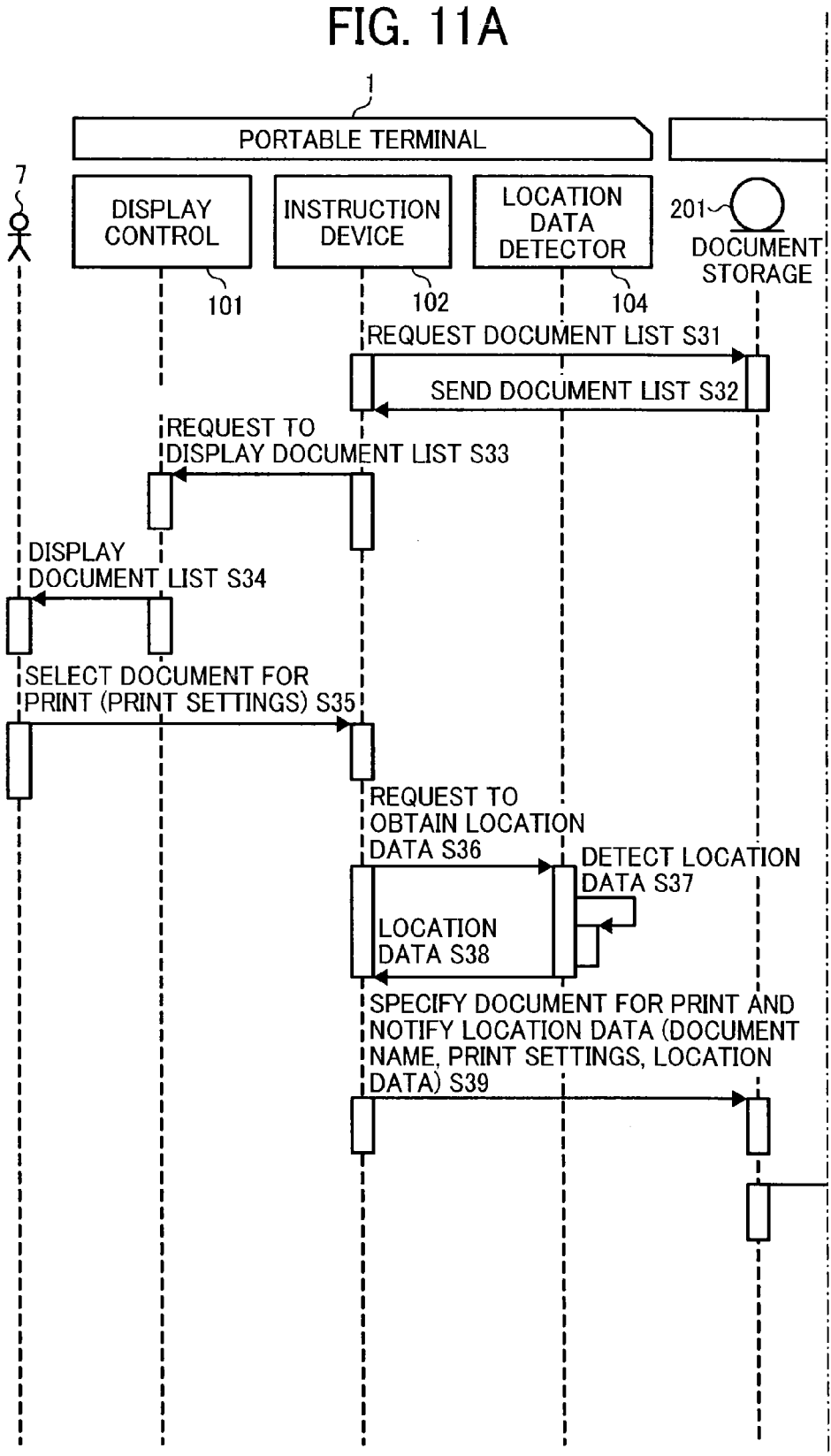

FIG. 9 illustrates an example printer list screen 410, which may be displayed at the portable terminal 1. The display control 101 of the portable terminal 1 displays the printer list screen 410, based on the compatible printer list transmitted from the server 2. The printer list screen 410 lists one or more compatible printers 3, which are determined by the server 2 as printers compatible with printing of the selected document data. Further, in this example, the printers are listed in the order determined by its distance to the terminal 1, such that the printer that is located closest to the portable terminal 1 is listed first.

The printer list screen 410 includes, for each printer, a printer name of the printer 3 in a column 411, a distance to the portable terminal 1 (user) in a column 412, and a link to a map display screen in a column 413. The map display screen displays thereon the location of the user (portable terminal 1) and the location of the printer 3. In one example, a map display screen may display all of the compatible printers 3 in the list as one screen. In such case, the link to the map will be the same for all printers listed in the printer list. Alternatively, the compatible printers 3 listed in the printer list may be displayed using a plurality of screens, for example, one screen for each printer 3, or one screen for a group of printers 3 located nearby. In such case, the link to the map will be different, depending on the map screen where the printer 3 is displayed.

As described above, the map display screen data may be generated by the server 2. The server 2 may send the map display screen data to the portable terminal 1, or send a link to the map display screen data that is stored in a memory that is accessible by the portable terminal 1. Alternatively, if the portable terminal 1 receives location data of each printer 3 listed in the compatible printer list from the server 2, the portable terminal 1 may generate a map display screen for one or more printers 3 using the map data of an area where the printers 3 connected to the network 5 reside.

FIG. 10 illustrates an example map display screen 420. The map display screen 420 displays all printers A to D, which are listed in the compatible printer list of FIG. 9. The map display screen 420 displays a map of surroundings of the portable terminal 1. In this example illustrated in FIG. 10, the portable terminal 1 is located in an office where five desks 422 are located. The mark 423 indicates the location of the portable terminal 1, that is, the location of the user. The star-shaped marks 424 each indicate the compatible printers A to D, which are listed in the compatible printer list. With the map display screen, the user can instantly recognize the location of each printer, and easily select the printer that the user can easily pick up the printed sheet. The map display screen 420 may be generated to have a different appearance. For example, the map may be displayed in three-dimensional image, or a pin indicating the specific location of the printer may be additionally displayed.

Referring now to FIGS. 11A, 11B, 12A, and 12B, operation of printing selected document data, performed by the document printing system of FIG. 8, is explained according to an example embodiment of the present invention.

As described above, S1 to S4 of FIG. 6 are optional in this case.

S31 to S35 of FIG. 11 are performed in a substantially similar manner as described above referring to S5 to S9 of FIG. 6.

In response to the user selection of the document data, at S36, the instruction device 102 of the portable terminal 1 sends a request for obtaining location data of the terminal 1, to the location data detector 104. At S37, the location data detector 104 detects the location data indicating the current location of the portable terminal 1, and at S38 sends the location data to the instruction device 102.

At S39, the instruction device 102 sends a request for compatible printer list, which includes the selected document data and the location data of the portable terminal 1, to the server 2. S39 is performed in a substantially similar manner as described above referring to S10 of FIG. 6, except that the location data of the terminal 1 is notified in alternative to the printer addresses of the nearby printers.

At S40, the document storage 201 of the server 2, which receives the request for compatible printer list, that is, the request for analyzing, sends the request for compatible printer list to the document/device data analyzer 203. The request includes the selected document data that is obtained by the document storage 201, the print settings information if received from the portable terminal 1, and the location data of the portable terminal 1.

At S41, the document/device data analyzer 203 sends the location data of the portable terminal 1 to the location data obtainer 205, and requests to extract one or more printers located near the portable terminal 1. At S42, the location data obtainer 205, in cooperation with the location data analyzer 206, extracts one or more printers located near the portable terminal 1, and at S43, sends the addresses of the extracted nearby printers to the document/device data analyzer 203. As described above, in this example, it is assumed that the location data and the address are stored in association with each other for each printer 3.

Referring to FIG. 12, S44 to S48 are performed in a substantially similar manner as described above referring to S12 to S16 of FIG. 7, except that the printer addresses are obtained at S43 of FIG. 11.

S49 to S55 of FIG. 12 are performed in a substantially similar manner as described above referring to S17 to S23 of FIG. 7. While operation of printing, corresponding to S24 and S25, is not illustrated, such steps are performed after S55.

In this example, the compatible printer list that the instruction device 102 obtains at S50 is a list of printers compatible with printing of the selected document data, which are selected based on the location data of each printer 3 with respect to the location data of the portable terminal 1 in addition to information regarding the document data and the device information of each printer. At S51, the display control 101 of the portable terminal 1 may display a compatible printer list, such as the screen of FIG. 9.

Referring now to FIGS. 13 to 20, the document printing system is explained according to an example embodiment of the present invention. In this embodiment, one or more compatible printers are selected at the portable terminal 1, based on information received from the server 2.

Figure 13:
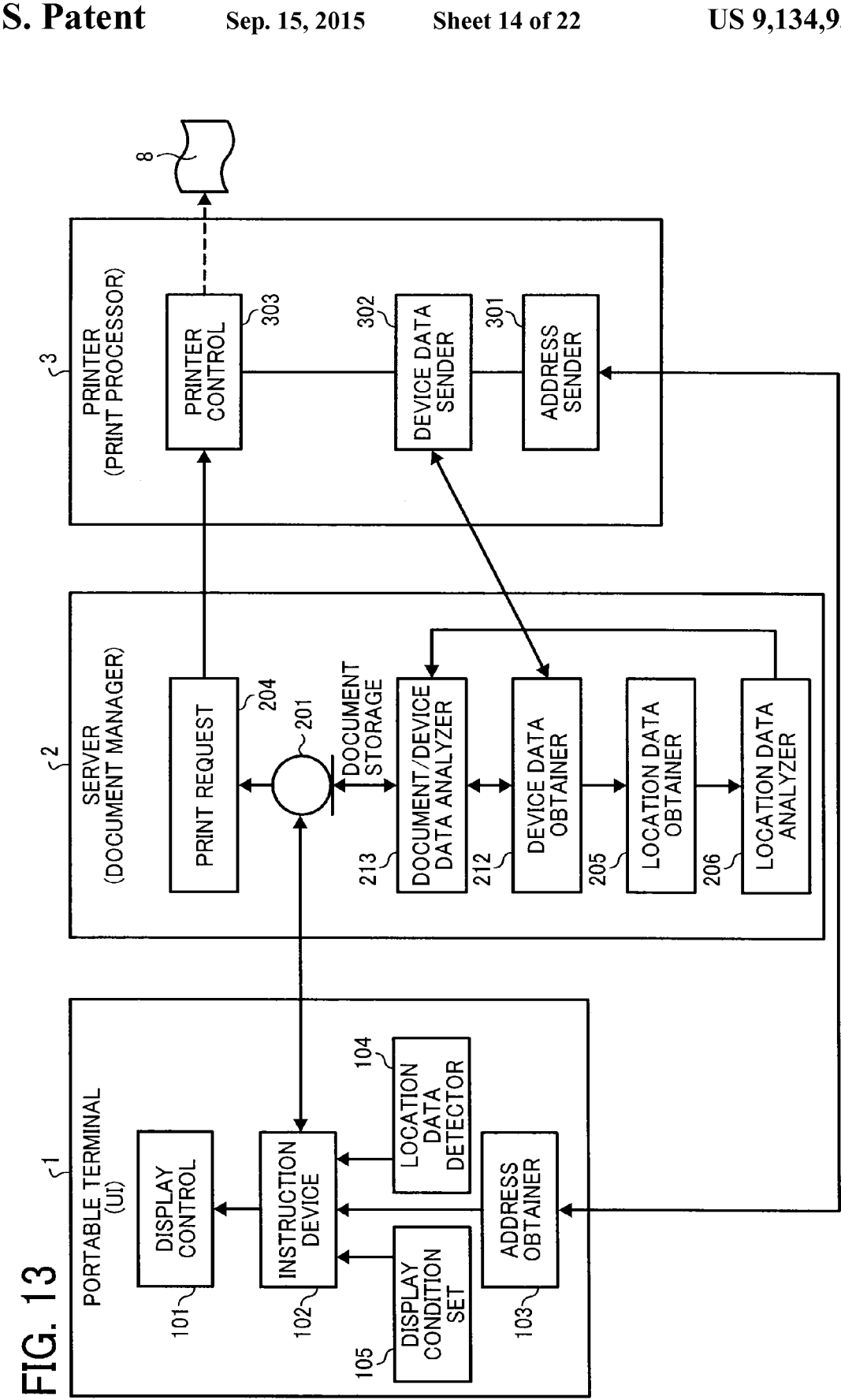
FIG. 13 is a schematic block diagram illustrating a functional structure of the document printing system, according to an example embodiment of the present invention.

In this embodiment, the portable terminal 1, the server 2, and the printer 3 have hardware structures of FIGS. 2 to 4 described above, but are different in functional structure than the document printing system of FIG. 8. More specifically, the printer 3 of FIG. 13 is substantially the same in functional structure with the printer 3 of FIG. 8. The portable terminal 1 of FIG. 13 is additionally provided with a display condition set 105. The server 2 of FIG. 13 includes a device data obtainer 212 and a document/device data analyzer 213, which are respectively different in function than the device data obtainer 202 and the document/device data analyzer 203 of FIG. 8.

In the above-described embodiment referring to FIGS. 5 to 12, the server 2 selects one or more printers that are compatible with printing of the selected document data, and sends a list of compatible printers to the portable terminal 1. Instead, in this embodiment, the server 2 sends a list of nearby printers 3 located near the portable terminal 1, with information that may be used by the user at the portable terminal 1 to select a compatible printer from the nearby printers. Such information includes, for example, information indicating a distance of each printer to the portable terminal 1, the operation state of the printer 3 such as whether the printer 3 is turned on, and whether each printer is compatible with printing of the document data according to the print settings information.

To allow the user to easily select a compatible printer, the portable terminal 1 determines one or more nearby printers 3 to be displayed as a candidate of the compatible printer, or an order of listing the nearby printers 3 when displayed. More specifically, the display condition set 105 of the portable terminal 1 receives an instruction for setting a display condition to be used for determining the printers to be displayed or an order of printers to be displayed.

The document/device data analyzer 213 is substantially similar in function to the document/device data analyzer 203, except for some differences. The differences include a list of printers to be transmitted to the portable terminal 1. More specifically, the document/device data analyzer 213 of the server 2 extracts one or more printers 3 that are located within a predetermined distance from the portable terminal 1, using the location data of each printer 3 and the location data of the portable terminal 1. The document/device data analyzer 213 provides a list of the nearby printers to the document storage 201.

The device data obtainer 212 is substantially similar in function to the device data obtainer 202, except for some differences. In this embodiment, the server 2 sends information regarding all of the nearby printers 3, even for the printer 3 that does not send device information to the device data obtainer 212. In such case, if information regarding the printer 3 that does not send device information is available other than the current operation state of the printer 3, the device data obtainer 212 sends such information to the document/device data analyzer 213. For example, the device information indicating the capability or the function of the printer 3 may be available, even for the printer 3 that does not send device information, as long as the device data obtainer 212 once obtains such information from the printer 3. More specifically, the device data obtainer 212 stores the device information, such as the device information indicating device specification, in a memory for later use. When the device data obtainer 212 determines that device information is not received from the printer 3 in response to a request for device information, the device data obtainer 212 determines that that printer 3 is turned off. The device data obtainer 212 further sends device information, which includes the stored device information indicating capability or function of the printer 3, and the operation state indicating that the printer 3 is turned off, to the document/device analyzer 213.

FIG. 14 illustrates a display condition settings screen 430, which allows the user to set a selection rule to be used for selecting a printer to be displayed as a candidate of compatible printer, and a priority order to be used for determining an order of displaying the printer. The display condition settings screen 430 may be displayed under control of the display control 101 of the portable terminal 1 at any desired time, for example, in response to a user request.

The display condition settings screen 430 includes a list of conditions that can be used as a selection rule in column 431. The "distance to user" indicates a distance between the portable terminal 1 and the printer 3. When this condition is set, the printer 3 having the shortest distance to the portable terminal 1 is displayed with a higher priority. That is, the printers 3 are sorted in an order from the printer 3 having the shorter distance, to the printer 3 having the longer distance.

The "device state" indicates an operation state of the printer 3, such as whether the printer 3 is turned on, whether the printer 3 is currently in use, and/or whether the printer 3 is in trouble. When this condition is set, the printer 3 that is turned on, not currently in use, and not in trouble, is displayed with a higher priority. Further, the printers 3 are sorted in an order from: the printer that is currently in use; the printer that is in trouble; and the printer that is turned off, etc.

The "spec (specification)" indicates whether the printer 3 is provided with a function of printing the selected document data according to the print settings information. As described above referring to the example case for the document printing system of FIG. 5, the device specification includes hardware specification and software specification. In this example, the device (printer 3) having the printing function is displayed with a higher priority. Further, the devices (printers 3) are sorted in an order from the printer capable of printing but lower compatibility; and the printer not capable of printing, etc. Since this example assumes that the printers 3 with the printing capability are provided on the network 5, in such case, the printer 3 having a higher compatibility to print the selected document data according to the print settings is sorted with a higher priority.

The display condition settings screen 430 of FIG. 14 further includes a column 432, which allows the user to input a priority order for each condition item. In this example illustrated in FIG. 14, the "device state" is set with a highest priority, and the "spec" is set with a next highest priority. The portable terminal 1 sorts the printers 3 based on the conditions according to the order of priority set by the user, and displays the sorted printers to the user.

The display condition settings screen 430 of FIG. 14 further includes a column 433, which allows the user to set whether to display the printer 3 that does not satisfy the corresponding condition item on the printer list as defined by the user.

For example, when the check box "YES" for the "distance to user" is selected, the printers 3 are displayed irrespective of whether the printer 3 is located far from the portable terminal 1 as long as the server 2 can detect the printer 3. When the check box "NO" for the "distance to user" is selected, the user may further select a threshold value for distance using a distance selection box 434. In FIG. 4, the printer 3 having a distance of 30 m or greater is not displayed.

When the check box "YES" for the "device state" is selected, the printers 3 having the operation state that is not capable of printing are displayed. When the check box "NO" for the "device state" is selected, the user may further select to not display the printer 3 that is in trouble and/or the printer 3 that is turned off.

When the check box "YES" for the "spec" is selected, the printers 3 are displayed irrespective of whether the printer 3 is capable of printing the selected document data according to the print settings. When the check box "NO" for the "spec" is selected, the printers 3 that are not capable of printing according to the print settings are not displayed.

FIG. 15 illustrates a printer list screen 440, which lists the nearby printers that are located near the portable terminal 1, when the display conditions are set as illustrated in FIG. 14. The display control 101 of the portable terminal 1 selects and sorts the nearby printers 3, based on information regarding the printers 3 received from the server 2, according to the display conditions set through the display condition settings screen 430. More specifically, the screen of FIG. 15 includes a set of display components, which allows the user to select a printer to print the selected document data from a candidate of printers 3.

The printer list screen 440 includes, for each printer 3, an order of each printer 3 obtained through sorting according to the priority set by the user in a column 441, a name of the printer 3 in a column 442, a distance to user (portable terminal) in a column 443, a link to a map display screen indicating the location of the printer 3 in a column 444, an operation state of the printer 3 in a column 445, and information indicating whether the printer 3 is capable of printing according to the print settings ("spec") in a column 446. The "OK" in column 446 indicates that the device (printer) 3 can print the document data according to the print settings, and the "NO" in column 446 indicates that the device (printer) 3 cannot print the document data according to the print settings. The map display screen is a screen as described above referring to FIG. 10.

In FIG. 15, the portable terminal 1 selects the printers 3 to be displayed from the nearby printers 3 received from the server 2 according to information indicating whether to display (column 433 in FIG. 14), and sorts the printers 3 to be displayed according to a priority order (column 432 of FIG. 14). In this example, the printers 3 are sorted based on the "device state" with the highest priority, and the "spec" with the next highest priority, and further excludes the printers 3 having the distance of 30 mm or greater.

As described above, the portable terminal 1 determines the printers 3 to be displayed and further determines an order of listing the printers 3 when displayed, according to the display condition set by the user. Accordingly, the portable terminal 1 is able to display the printer that is most desirable for the user, while still considering the printer that is compatible with printing of the selected document data. For example, as illustrated in FIG. 15, by causing the display panel 17 to display the printer 3 that is turned off, the user may select such printer 3 if that printer 3 satisfies the other conditions. If the user desires, the user may turn on the power of that printer 3 to print the selected document data.

Figure 16A:
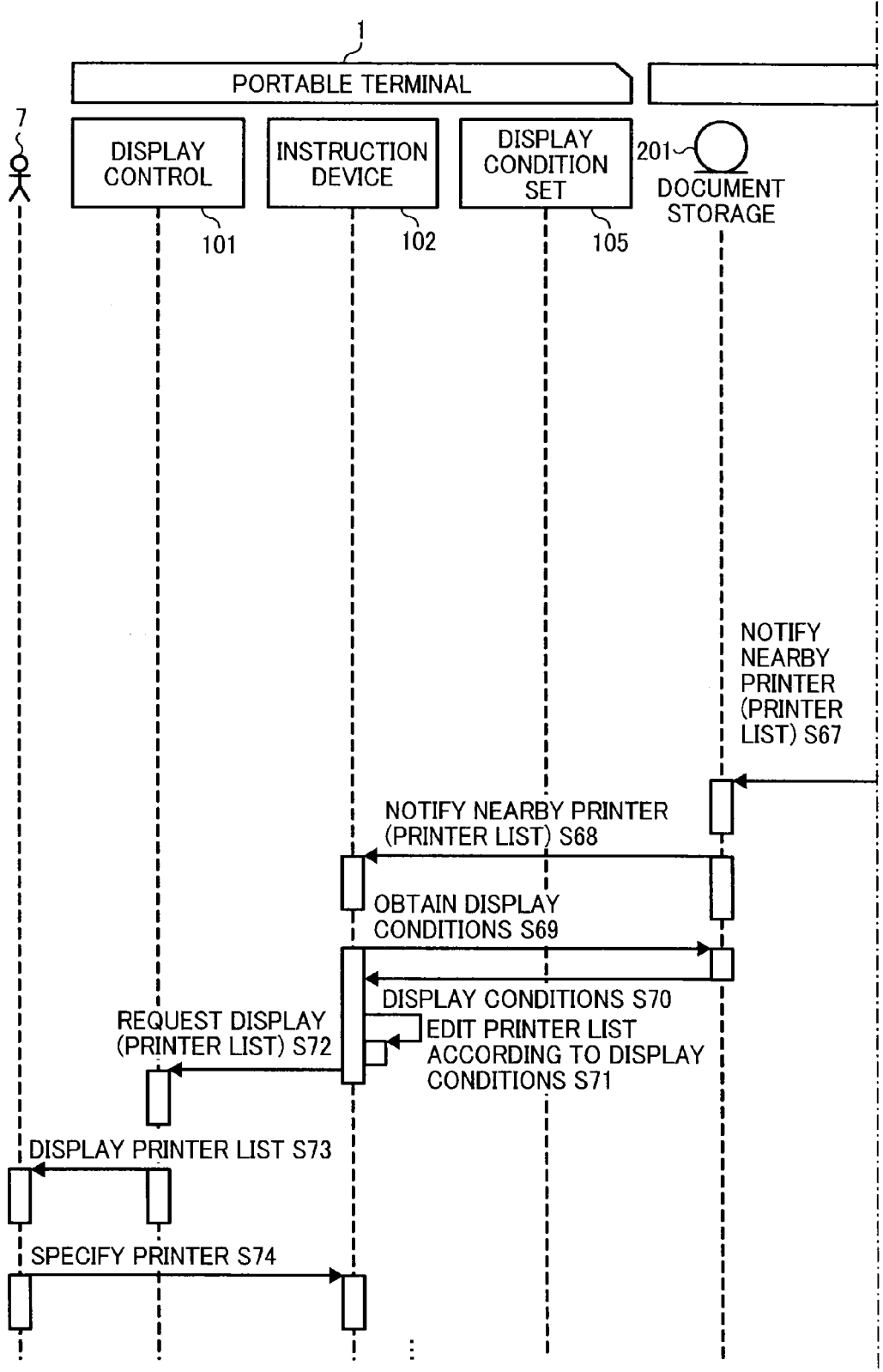

Referring now to FIG. 16, operation of printing the document data selected by the user, performed by the document printing system of FIG. 13, is explained according to an example embodiment of the present invention.

S61 to S63 of FIG. 16 are performed in a substantially similar manner as described above referring to S44 to S46 of FIG. 12. At S64, the device data obtainer 212 stores the device information, which is obtained from each printer 3 at S63. At S65, the device data obtainer 212 sends the device information obtained from each printer 3 to the document/device data analyzer 213. As described above, when the device information is not obtained from the printer 3 at S63, the device data obtainer 212 sends the device information other than the operation state of the printer 3, together with the operation state indicating that the printer 3 is turned off, to the document/device data analyzer 213.

At S66, the document/device data analyzer 213 determines whether the printer 3 is capable of printing the selected document data according to the print settings information in a substantially similar manner as described above referring to S16 of FIG. 7 and S48 of FIG. 12. However, in this example, the document/device data analyzer 213 does not exclude the printers 3 not capable of printing the selected document data according to the print settings information, but stores the analysis result.

S67 and S68 are performed in a substantially similar manner as described above referring to S49 and S50 of FIG. 12. The printer list that is sent at S67 and S68 is not a list of compatible printers, but a list of nearby printers. That is, as described above referring to FIGS. 14 and 15, information regarding the nearby printer 3 is sent to the portable terminal 1, to be selected or sorted at the portable terminal 1.

At S69, the instruction device 102 of the portable terminal 1 instructs the display condition set 105 to obtain information regarding the display conditions, which is set through the display condition settings screen 430 of FIG. 14. At S70, the display condition set 105 sends the display conditions to the instruction device 102. At S71, the instruction device 102 determines one or more printers 3 to be displayed, and an order of listing the printers 3 when displayed, according to the display conditions, and edits the printer list that is received at S68. At S72, the instruction device 102 requests the display control 101 to display the printer list, that is edited, on the display panel 17 in a substantially similar manner as described above referring to S51 of FIG. 12.

At S73, the display control 101 causes the display panel 17 to display the printer list. After S73, the operation proceeds to S74 and the other steps, in a substantially similar manner as described above referring to S21 to S25 of FIG. 7 and S53 to S55 of FIG. 12.

While the above-described example assumes that the portable terminal 1 stays at the same location, at least from the time when the user requests to obtain a printer list to the time when the user requests the printer to execute printing. However, the user at the portable terminal 1 may move, for example, while displaying the printer list (such as the printer list screen 440). In such case, the printer list is updated as illustrated in FIG. 17.

Figure 17:
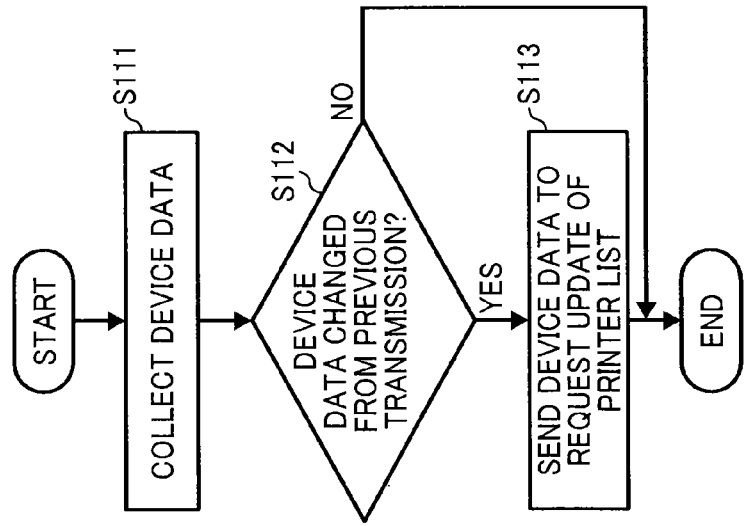
FIG. 17 is a flowchart illustrating operation of determining whether to update a printer list, performed by the portable terminal, according to an example embodiment of the present invention.

FIG. 17 is a flowchart illustrating operation of updating the printer list, performed by the CPU 11 of the portable terminal 1, according to an example embodiment of the present invention. The operation of FIG. 17 is periodically performed by the portable terminal 1 while displaying the printer list.

At S101, the CPU 11 obtains the current location of the portable terminal 1 using the location data detector 104. At S102, the CPU 11 determine whether the current location of the portable terminal 1 has changed for more than a predetermined value than the previously obtained location that is obtained when displaying (that is, generating) the printer list. When it is determined that the location has changed ("YES" at S102), the operation proceeds to S103. Otherwise ("NO" at S102), the operation ends.

At S103, the CPU 11 sends the current location data to the server 2 to request for updating the printer list. In response to the request, the server 2 performs S40 to S43 of FIG. 11 and S61 to S68 of FIG. 16 to send the updated printer list to the portable terminal 1.

At S104, the CPU 11 obtains the updated printer list from the server. At S105, the CPU 11 updates a printer list screen based on the printer list that is sent in a substantially similar manner as described above referring to S68 to S72 of FIG. 16, and the operation ends.

As described above, even when the portable terminal 1 is moved to another location, after displaying the printer list screen 440, the portable terminal 1 automatically updates the contents of the printer list to display the nearby printers 3 with updated information in real time. Accordingly, the user can easily select the printer 3 that is most desirable for the user.

At S102, when the location data indicating the location of each printer 3 is available, the portable terminal 1 may determine whether an order of printers 3 in the printer list has changed, due to the change in a distance between the portable terminal 1 and the printer 3 listed on the printer list.

Figure 18:
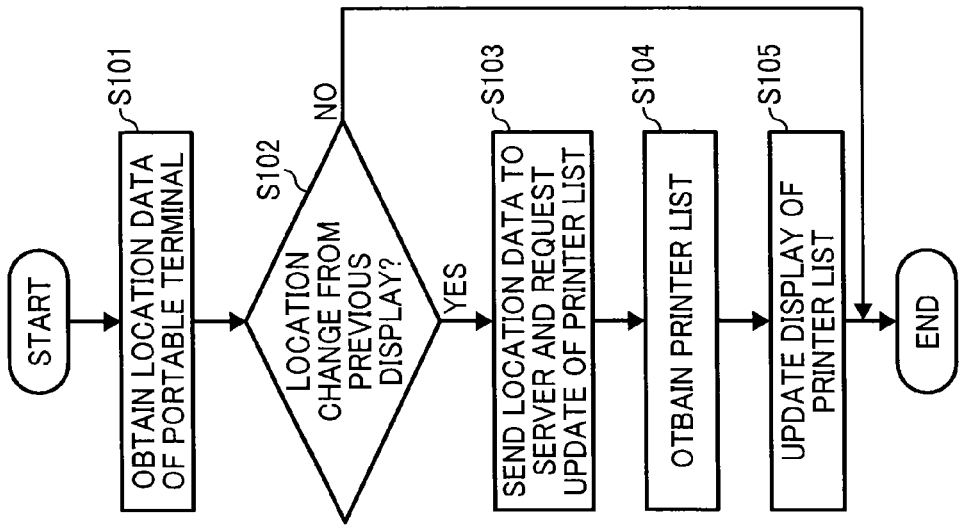
FIG. 18 is a flowchart illustrating operation of determining whether to update a printer list, performed by the server, according to an example embodiment of the present invention.

The printer list, such as the printer list screen 440, may be updated to reflect the change in operation state of the printer 3. FIG. 18 is a flowchart illustrating operation of updating the printer list, performed by the CPU 21 of the server 2, according to an example embodiment of the present invention. The operation of FIG. 18 is periodically performed by the CPU 21 of the server 2, during the time when the portable terminal 1 is displaying the printer list. For example, the CPU 21 of the server 2 determines that the printer list is being displayed, from the time when the printer list is sent at S68 (FIG. 16), to the time when a request for selecting the printer at S22 (FIG. 7) of canceling the request.

Referring to FIG. 18, at S111, the CPU 21 collects device information from each printer 3 in a substantially similar manner as described above referring to S61 to S66 of FIG. 16. At S112, the CPU 21 determines whether there is any change in device information from the time when the printer list is transmitted to the portable terminal 1. When it is determined that there is any change in device information ("YES" at S112), the operation proceeds to S113. Otherwise ("NO" at S112), the operation ends.

At S113, the CPU 21 of the server 2 sends the most updated device information to the portable terminal 1, and requests to update the printer list based on the updated device information. In this manner, the printer list being displayed at the portable terminal 1 can reflect the most updated device information, such as the most current operation state of the printer 3. For example, when the printer 3 is turned on or off, or the use of the printer 3 is changed from "currently use" to "not use", the printer list at the portable terminal 1 is updated to reflect such change even after the printer list is displayed.

Figure 19:
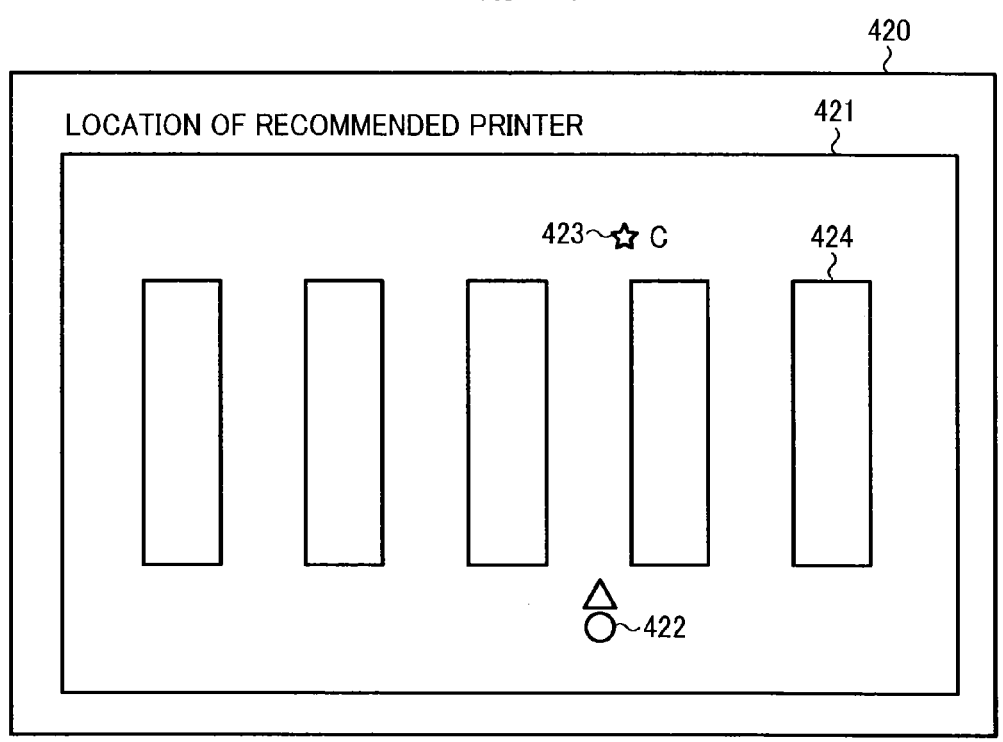
FIG. 19 is an illustration of an example map screen.

Further, in the above-describe example, the portable terminal 1 may automatically display a map display screen 420 of FIG. 19, which displays the printer 3 that is most desirable for the user while displaying the printer list screen 440 of FIG. 15. The most desirable printer 3 is the printer 3, which is listed first in the printer list displayed on the printer list screen 440. In the above-described example, the map display screen 420 of FIG. 19 is displayed, for example, when the user selects the link to the map for the printer C. Alternatively, the map display screen 420 may be displayed automatically by the portable terminal 1, with or without the printer list screen 440.

The printer 3, which is listed first on the printer list, is the printer that satisfies the conditions set by the user. Since the user is most likely to select this printer, the portable terminal 1 may automatically display the map display screen 420 to indicate the location of the printer, thus, allowing the user to instantly recognize the location of the printer. The map display screen 420 may be displayed in various ways, for example, as a pop-up window, a tab, or a screen that can be switched from the printer list screen, etc.

Figure 20:
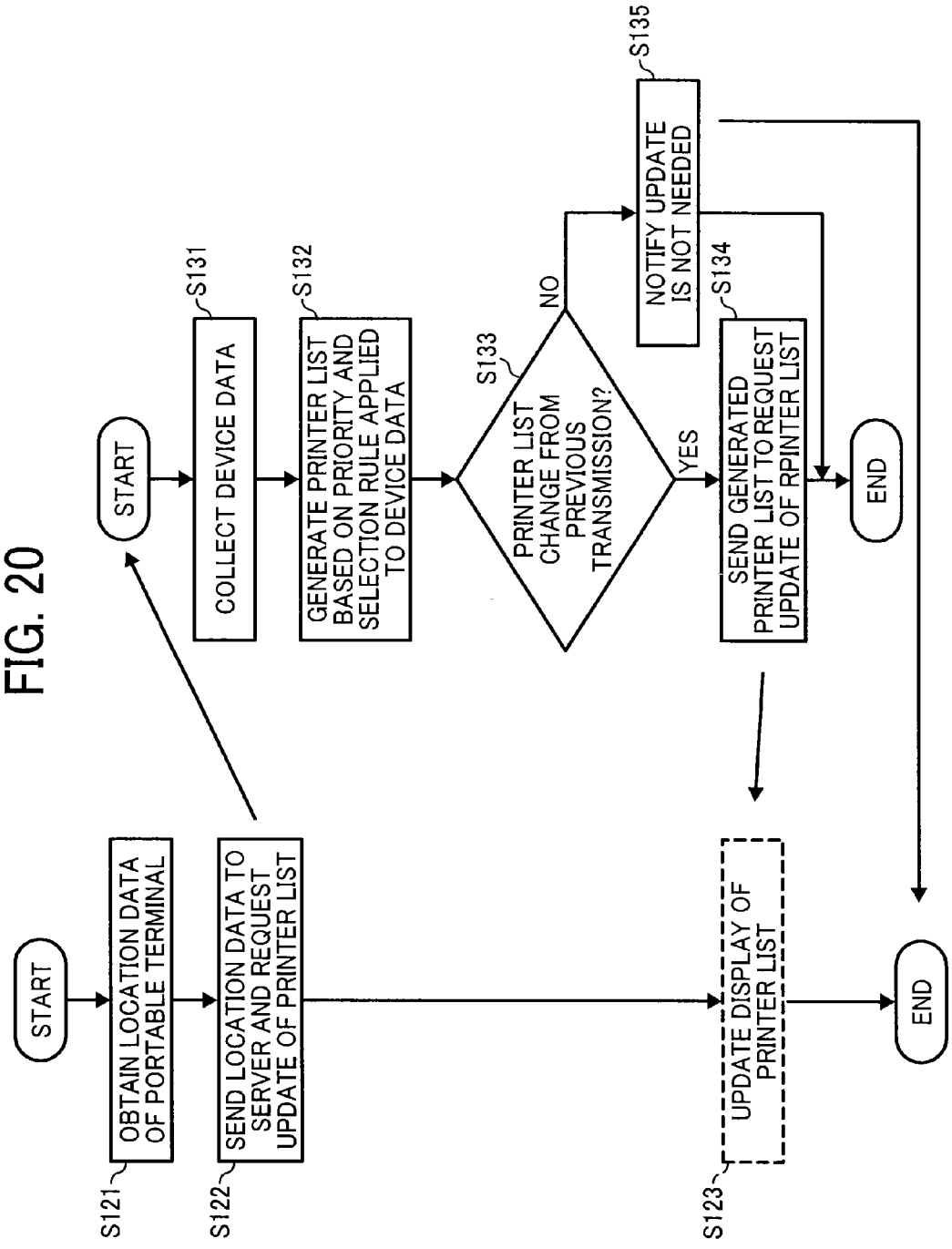
FIG. 20 is a flowchart illustrating operation of determining whether to update a printer list, performed by the document printing system of FIG. 13, according to an example embodiment of the present invention.

Referring now to FIG. 20, operation of updating the printer list is explained according to an example embodiment of the present invention. In this example case, it is assumed that, while the printer list (printer list screen 440) is being displayed, the printers 3 to be listed on the printer list change, for example, as the portable terminal 1 is moved.

Further, in the above-described example referring to FIG. 16, the portable terminal 1 determines the printers 3 to be displayed or an order of listing the printers 3, according to the selection rule or the priority order that are received at the display condition set 105 through the display condition settings screen 430. Alternatively, the instruction device 102 of the portable terminal 1 may send the display conditions, such as the selection rule or the priority order, to the server 2. The server 2 may register the display conditions in association with the identification information for identifying the portable terminal 1. After performing S66 of FIG. 16, the server 2 may generate the printer list, based on the display conditions. In such case, the portable terminal 1 may display the printer list screen 440, according to the printer list received from the server 2, in a substantially similar manner as described above referring to S50 to S52 of FIG. 12.

In this example illustrated in FIG. 20, it is assumed that the printer list is generated according to the selection rule or the priority order at the server side.

The operation of FIG. 20 is performed by the CPU 11 of the portable terminal 1 and the CPU 21 of the server 2. More specifically, the CPU 11 of the portable terminal 1 periodically performs steps at the left side of the flowchart, while displaying the printer list.

At S121, the CPU 11 of the portable terminal 1 obtains the location data indicating the current location of the portable terminal 1 using the location data detector 104. At S122, the portable terminal 11 sends the location data to the server 2 to request for updating the printer list.

In response to the request for updating, the CPU 21 of the server 2 starts steps at the right side of the flowchart of FIG. 20. At S131, the server 2 collects device information from the nearby printers 3 in a substantially similar manner as described above referring to S40 to S43 of FIG. 11 and S61 to S66 of FIG. 16.

At S132, the server 2 applies the selection rule and the priority order, which are stored in association with the portable terminal 1 that requests for updating, to the device information collected at S131 to generate a printer list for display at the portable terminal 1.

At S133, the CPU 21 of the server 2 determines whether the printer list, which is generated at S132, has changed from the printer list that has been transmitted to the portable terminal 1 for the previous time. When it is determined that the printer list has been changed ("YES" at S133), the operation proceeds to S134 to send the newly generated printer list to the portable terminal 1 with a request for updating the printer list, and the operation ends.

In response to the request for updating the printer list, the portable terminal 1 proceeds to perform S123 to update the printer list (such as the printer list screen 440) based on the updated printer list transmitted from the server 2, in a substantially similar manner as described above referring to S50 to S52 of FIG. 12. When it is determined that printer list has not been changed ("NO" at S133), at S135, the CPU 21 of the server 2 sends notification indicating that update is not needed to the portable terminal 1. In response to the notification, the CPU 11 ends the operation without performing S123, thus not updating the printer list.

As described above, even when the portable terminal 1 is moved while the printer list screen 440 is being displayed, the portable terminal 1 can constantly update the printer list to reflect the most updated information in real time. For example, the printer list may change as the portable terminal 1 changes its location. In another example, the printer list may change when the operation state of the printer 3 changes.

While the operation of FIG. 20 is explained assuming that the printer list is generated and updated at the server 2, the printer list may be generated and updated at the portable terminal 1. In such case, S132 and S133 of FIG. 20 are performed at the portable terminal 1.

Figure 21:
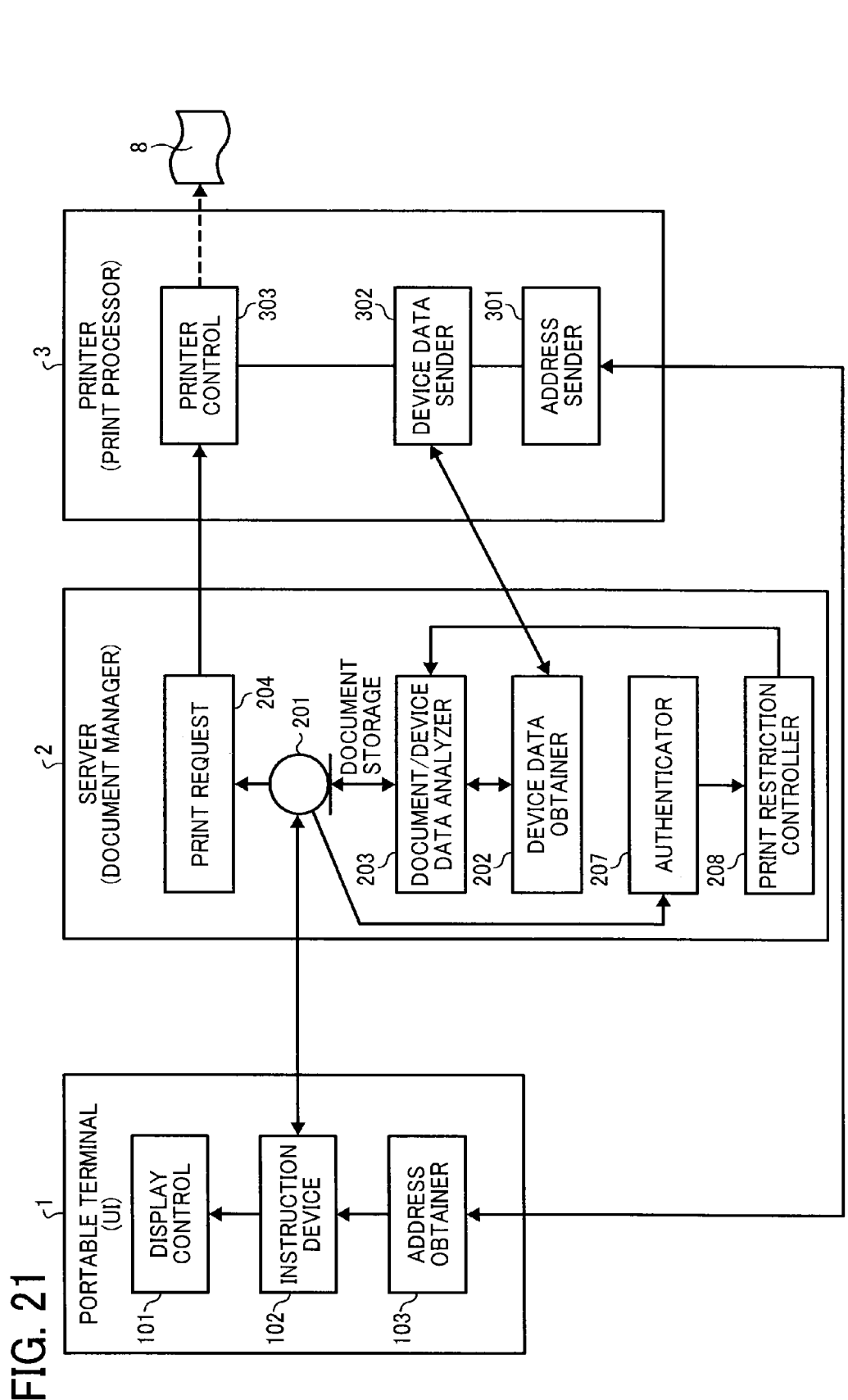
FIG. 21 is a schematic block diagram illustrating a functional structure of the document printing system of FIG. 1, according to an example embodiment of the present invention.

Referring now to FIG. 21, a document printing system is explained according to an example embodiment of the present invention. In this embodiment, the portable terminal 1, the server 2, and the printer 3 have hardware structures of FIGS. 2 to 4 described above, but are different in functional structure than the document printing system of FIG. 5. More specifically, the printer 3 of FIG. 21 is substantially the same in functional structure with the printer 3 of FIG. 5. The portable terminal 1 of FIG. 21 is substantially similar in functional structure with the portable terminal 1 of FIG. 5. The server 2 of FIG. 21 is additionally provided with an authenticator 207 and a print restriction controller 208.

The authenticator 207 registers, for each one of the users who is allowed to use the document printing system, a user ID and authentication information (such as a password). The information regarding the users may be modified, added, or delete, by the administrator of the system.

The print restriction controller 208 stores print restriction information indicating document data that the user is not allowed to print, or indicating the printer that the user is not allowed to use. The print restriction information may be stored for one or more registered users.

In this example, in response to the user instruction that selects the document data to be printed from the user, the portable terminal 1 requests the user to input a user ID and a password. The instruction device 102 sends the user ID and the password, input by the user, with information indicating the selected document data and printer addresses, to the server 2.

The document storage 201 of the server 2 sends the user ID and the password to the authenticator 207. The authenticator 207 determines whether the user is an authenticated user, using the user ID and the password. When the user is the authenticated user, the authenticator 207 sends the user ID to the print restriction controller 208 to determine whether there is any restriction to the authenticated user. When there is any restriction to the authenticated user, the print restriction controller 208 notifies information indicating specific restriction to the document/device data analyzer 203.

In case the selected document data is document data that the user is not allowed to print, the document/device data analyzer 203 notifies the document storage 201 that printing of the selected document data is not allowed, without analyzing the document data or the device information. The document storage 201 notifies the portable terminal 1 that printing of the selected document data is not allowed, to cause the display control 101 to display such message through the instruction device 102. This prevents any document data, which is not allowed for use by the user, to be printed out. This further prevents a printer list from being displayed or even generated, even when the document data is not allowed to be printed by the user.

In case there is any printer 3 that the user is not allowed to use, the document/device data analyzer 203 is notified of the address of the printer, and removes that printer from a candidate of printers to be displayed in the printer list. This prevents any printer, which is not allowed for use by the user A, to be displayed in the printer list.

As described above, even when there is restriction to the document data or the printer, as long as the document data selected by the user can be printed by the user, the server 2 can generate a printer list while removing the printer that cannot be used by the user from a candidate of printers.

Figure 22:
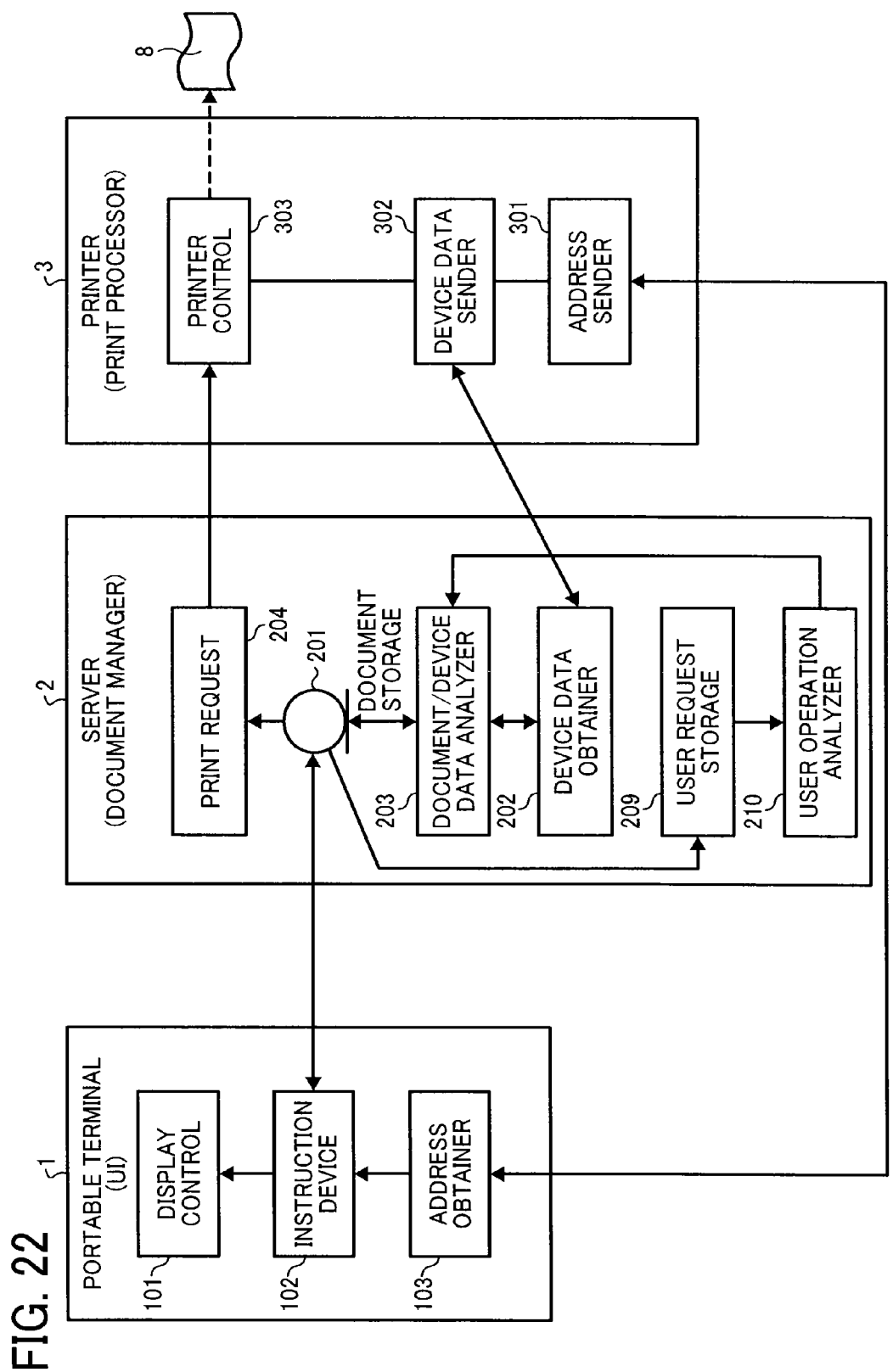
FIG. 22 is a schematic block diagram illustrating a functional structure of the document printing system of FIG. 1, according to an example embodiment of the present invention.

Referring to FIG. 22, a document printing system is explained according to an example embodiment of the present invention. In this embodiment, the portable terminal 1, the server 2, and the printer 3 have hardware structures of FIGS. 2 to 4 described above, but are different in functional structure than the document printing system of FIG. 5. More specifically, the printer 3 of FIG. 22 is substantially the same in functional structure with the printer 3 of FIG. 5. The portable terminal 1 of FIG. 22 is substantially similar in functional structure with the portable terminal 1 of FIG. 5. The server 2 of FIG. 22 is additionally provided with a user request storage 209 and a user operation analyzer 210.

The user request storage 209 stores print settings information, which is transmitted from the portable terminal 1 with selection of the document data to be printed and printer addresses. The user request storage 209 further stores selection of the printer. More specifically, the user request storage 209 stores the print settings information and the selected printer in association with a user ID for identifying the user.

When the document storage 201 receives information with the user ID, the user operation analyzer 210 obtains and analyzes the print settings information and the selected printer, which is previously stored for the user ID in the user request storage 209. More specifically, the user operation analyzer 210 determines characteristics of user operation, based on trends in print settings and/or printer selected by the user in the past, and sends the analysis result indicating the user characteristics to the document/device analyzer 203.

The document/device analyzer 203 generates a printer list based on the user characteristics, in addition to the analysis result generated based on the document data and the device information of each printer. Accordingly, the server 2 is able to propose one or more printers compatible with printing of the selected document data according to the print settings information, while considering the user characteristics.

For example, for the user who frequently uses a toner save function, the server 2 may select the printer provided with a toner save function in priority. For the user who frequently uses double-sided printing, the server 2 may select the printer provided with the double-sided printing function in priority, preferably, with the higher capability in double-printing. For the user who frequently prints color document data in monochrome, the server 2 may select the monochrome laser printer in priority. For the user who frequently prints document data using a specific printer, the server 2 may select that specific user in priority.

Numerous additional modifications and variations are possible in light of the above teachings. It is therefore to be understood that within the scope of the appended claims, the disclosure of the present invention may be practiced otherwise than as specifically described herein.

The server 2 may be additionally provided with various other functions. For example, the document/device data analyzer 203 may be provided with a valid/invalid selector that allows the user to set specific items to be used for analyzing the document data or device information. More specifically, the user sets either valid or invalid for each item of various information used for analyzing the document data or device information. The document/device data analyzer 203 uses the items of information, which are set with valid, to analyze the document data or device information to generate a printer list. With this configuration, the user can previously set specific items to be used for analyzing document data or device information, such that the printer list is generated according to user preference.

For example, for the user who does not care much about a printing speed, the printing capability may not be an important factor to be considered. In such case, the user may set the printing capability item to invalid. In another example, for the user who does not care much about toner consumption, any item related to toner consumption may not be an important factor to be considered. In such case, the user may set the item related to toner consumption, such as the toner save mode, to invalid.

Further, the server 2 may be additionally provided with a function of calculating a selection algorithm for selecting a compatible printer based on the relationship between the printer specified by the user and print settings set by the user. With this selection algorithm, a selection rule to be applied by the document/device analyzer 203 to determine a compatible printer may be automatically updated.

Further, elements and/or features of different illustrative embodiments may be combined with each other and/or substituted for each other within the scope of this disclosure and appended claims.

For example, the server 2 of FIG. 8 or FIG. 13 may additionally include the authenticator 207 and the print restriction controller 208 of FIG. 21. The server 2 of FIG. 8 or FIG. 13 may additionally include the user request storage 209 and the user operation analyzer 210 of FIG. 22.

In the above-described embodiments, it is explained that the portable terminal 1 and the server 2 transmit or receive various data through the instruction device 102 and the document storage 201. In terms of hardware configuration, the wireless communication port 15 under control of the CPU 11 of the portable terminal 1, and the NIC 25 under control of the CPU 21 of the server 2 communicate various data with each other.

Further, various elements in the server 2 may not be provided within one machine, such that the elements in the server 2 may be distributed over a plurality of machines over a network. Further, any one of the elements in the server 2 may be provided as a part of the printer 2 or as a part of the portable terminal 1. For example, the document storage 201, which stores various data such as document data, may be provided separately than the other elements of the server 2.

Further, any one of the above-described operation of printing document data may be performed in various other ways, for example, in different order. For example, in the above-described example, the system performs operation of extracting one or more printers that are located near the portable terminal, in prior to generating compatible printer information that indicates one or more compatible printers compatible with printing of the document data. Alternatively, the system may perform operation of extracting one or more printers that are capable of printing the document data to be printed, for example, using information related to the document data, print settings information, specification information of each printer, etc. After narrowing down the number of printers in this manner, the system may further select one or more nearby printers, from the printers capable of perming printing, to specify one or more compatible printers compatible with printing of the document data to be printed. Alternatively, the above-described operation of extracting nearby printers and operation of extracting compatible printers may be performed concurrently. In such case, the compatible printers are determined based on various factors including the location data of the portable device and the printer, the information related to the document data, the device information such as specification of the printer, etc. Further, as described above, the factors to be considered may be selected, or the weight to each factor to be considered, may be set according to the user preference.

In the above-described embodiments, the portable terminal 1 and the server 2 cooperate with each other to provide a function of user interface, which displays a display element that reflects a printer list. Alternatively, the user interface that displays a screen to the user based on various information may be provided separately from the other elements of the portable terminal 1. Further, examples of display element include, but not limited to, a screen (such as a printer list screen 440), a window, a pop-up window, a dialog, etc., which may be displayed onto any desired display or any medium capable of displaying information thereon.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A management apparatus communicable with a portable device and a plurality of printers, comprising:
   a receiver configured to receive information indicating data to be printed, and location data indicating a current location of the portable device, from the portable device through the network;
   a processing circuitry configured to
      extract, from the plurality of printers on the network, one or more nearby printers located within a predetermined distance from the portable device using the location data of the portable device and location data of each printer, and
      generate compatible printer information indicating one or more compatible printers compatible with printing of the data to be printed, which are selected from the one or more nearby printers using information related to the data to be printed and specification data of each one of the nearby printers; and
   a transmitter configured to transmit the compatible printer information indicating the one or more compatible printers to the portable terminal through the network, and cause the portable device to display a screen that lists one or more compatible printers based on the compatible printer information,
   wherein the processing circuitry is further configured to determine an order of the one or more compatible printers when listed on the screen, such that the printer having the shortest distance to the portable device and having a specification compatible with printing of the data to be printed is listed with priority,
   wherein, when the receiver receives updated location data of the portable device indicating the change in current location during when the portable device is displaying the screen that lists the compatible printers, the processing circuitry extracts one or more nearby printers using the updated location data of the portable device and the location data of each printer, and generates updated compatible printer information indicating one or more compatible printers that reflect the change in current location of the portable device, and
   the transmitter transmits the updated compatible printer information for display at the portable device.

2. The management apparatus of claim 1, wherein the processing circuitry is further configured to
   request each one of at least the nearby printers to send state information indicating a current operation state of the printer, in response to receiving the information indicating data to be printed and the location data from the portable device, and
   the compatible printer information is generated using the state information of the printer in addition to the information related to the data to be printed and the specification data of the printer.

3. The management apparatus of claim 2, wherein, when the receiver receives updated state information of the printer indicating the change in current operation state during when the portable device is displaying the screen that lists the compatible printers,
   the processing circuitry extracts one or more compatible printers using the information related to the data to be printed and the updated state information of the printer, and generates updated compatible printer information indicating one or more compatible printers that reflect the change in current location of the portable device, and
   the transmitter transmits the updated compatible printer information for display at the portable device.

4. The management apparatus of claim 2, wherein the processing circuitry determines the one or more compatible printers and the order of the one or more compatible printers to be listed on the screen, according to a display condition that is previously set by the user.

5. The management apparatus of claim 4, wherein, when the display condition is set to display the printer having the state information indicating that the printer is turned off, or the state information indicating that the printer is currently in use to perform another job, as the compatible printer,
   the screen being displayed at the portable device includes, for selection by the user, the nearby printer having the state information indicating that the printer is turned off or indicating that the printer is currently in use, as the compatible printer compatible with printing of the data to be printed.

6. The management apparatus of claim 1, wherein the processing circuitry is further configured to generate, for each one of the one or more compatible printers, map data showing the location of the compatible printer with respect the current location of the portable device using the location data of the printer and the location data of the portable device, and
   the transmitter further transmits the map data or information allowing access to the map data for display at the portable device.

7. The management apparatus of claim 1, wherein the information related to the data to be printed includes information obtained from the data itself or information associated with the data, which is to be reflected onto a printed image of the data when printed by the printer.

8. A data management system communicable with a plurality or printers, comprising:
   a memory that stores various data; and one or more processors that
- receive information indicating data to be printed selected from the data stored in the memory, and location data indicating a current location of a portable device operated by a user;
- extract, from the plurality of printers on a network, one or more nearby printers located within a predetermined distance from the portable device using the location data of the portable device and location data of each printer, and
- generate compatible printer information indicating one or more compatible printers compatible with printing of the data to be printed, which are selected from the one or more nearby printers using information related to the data to be printed and specification data of each one of the nearby printers; and
- cause a display provided for the portable device to display a screen that lists one or more compatible printers based on the compatible printer information, wherein the one or more processors further determine an order of the one or more compatible printers when listed on the screen, such that the printer having the shortest distance to the portable device and having specification compatible with printing of the data to be printed is listed with priority, and wherein, in response to detection of updated location data of the portable device indicating the change in current location during when the portable device is displaying the screen that lists the compatible printers, the one or more processors further extract one or more nearby printers using the updated location data of the portable device and the location data of each printer, generate updated compatible printer information indicating one or more compatible printers that reflect the change in current location of the portable device, and cause the display provided for the portable device to display the updated compatible printer information.

9. The system of claim 8, wherein the one or more processors further
- request each one of at least the nearby printers to send state information indicating a current operation state of the printer, in response to receiving the information indicating data to be printed and the location data from the portable device, and
- the compatible printer information is generated using the state information of the printer in addition to the information related to the data to be printed and the specification data of the printer.

10. The system of claim 9, wherein, in response to detection of updated state information of the printer indicating the change in current operation state during when the portable device is displaying the screen that lists the compatible printers,
- the one or more processors extract one or more compatible printers using the information related to the data to be printed and the updated state information of the printer, generate updated compatible printer information indicating one or more compatible printers that reflect the change in current location of the portable device, and cause the display provided for the portable device to display the updated compatible printer information.

11. A method of displaying a user interface for a user management system communicable with a portable device and a plurality of printers, comprising:
- receiving information indicating data to be printed, and location data indicating a current location of the portable device, from the portable device through the network;
- extracting, from the plurality of printers on the network, one or more nearby printers located within a predetermined distance from the portable device using the location data of the portable device and location data of each printer,
- generating compatible printer information indicating one or more compatible printers compatible with printing of the data to be printed, which are selected from the one or more nearby printers using information related to the data to be printed and specification data of each one of the nearby printers; and
- transmitting the compatible printer information indicating the one or more compatible printers to the portable terminal through the network, and causing the portable device to display a screen that lists one or more compatible printers based on the compatible printer information, wherein the method further includes
determining an order of the one or more compatible printers when listed on the screen, such that the printer having the shortest distance to the portable device and having a specification compatible with printing of the data to be printed is listed with priority, wherein, when receiving updated location data of the portable device indicating the change in current location during when the portable device is displaying the screen that lists the compatible printers, extracting one or more nearby printers using the updated location data of the portable device and the location data of each printer, and generating updated compatible printer information indicating one or more compatible printers that reflect the change in current location of the portable device, and transmitting the updated compatible printer information for display at the portable device.

* * * * *